(12) United States Patent
Gervais et al.

(10) Patent No.: US 6,550,013 B1
(45) Date of Patent: Apr. 15, 2003

(54) MEMORY CLOCK GENERATOR AND METHOD THEREFOR

(75) Inventors: Gilles Gervais, Austin, TX (US); James D. Wagoner, Georgetown, TX (US); Stephen D. Weitzel, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/388,952

(22) Filed: Sep. 2, 1999

(51) Int. Cl.$^7$ .............................................. G06F 1/08
(52) U.S. Cl. ...................... 713/501; 327/116
(58) Field of Search ..................... 377/47; 327/115, 327/116; 713/501

(56) References Cited

U.S. PATENT DOCUMENTS

| | | | | |
|---|---|---|---|---|
| 3,414,720 A | * | 12/1968 | Battarel ........................ | 377/47 |
| 3,992,612 A | * | 11/1976 | Dunn ........................... | 377/47 |
| 5,530,387 A | * | 6/1996 | Kim ............................ | 327/119 |
| 5,721,501 A | * | 2/1998 | Toyoda et al. ............... | 327/116 |
| 5,805,912 A | * | 9/1998 | Johnson et al. ............... | 712/40 |
| 6,087,864 A | * | 7/2000 | Aoki ........................... | 327/116 |
| 6,177,823 B1 | * | 1/2001 | Saeki .......................... | 327/277 |

OTHER PUBLICATIONS

IBM Technical Disclosure Bulletin, vol. 32 No. 9A pp. 345–350, Feb. 1990, "Dynamic Clock Frequency Changing for a Memory Controller".*

* cited by examiner

*Primary Examiner*—Thomas Lee
*Assistant Examiner*—Albert Wang
(74) *Attorney, Agent, or Firm*—Barry S. Newberger; Winstead Sechrest & Minick P.C.; Robert M. Carwell

(57) ABSTRACT

A memory clock generator apparatus and method are implemented. The memory clock is generated, "open loop," from a processor clock. The processor clock is gated into, and propagated through a shift register. A set of outputs tapped off of the shift register is decoded, along with a plurality of control signals, in AND-OR logic to generate a clock output, which may run at a predetermined multiple of the memory clock rate. The clock output may have one of a plurality of ratios of memory clock period to processor clock period. The control signals select the ratio. The clock generator may be started asynchronously, and, additionally, the generator outputs a signal to the processor having an edge that has a predetermined temporal relationship with the start of the clock generator.

24 Claims, 16 Drawing Sheets

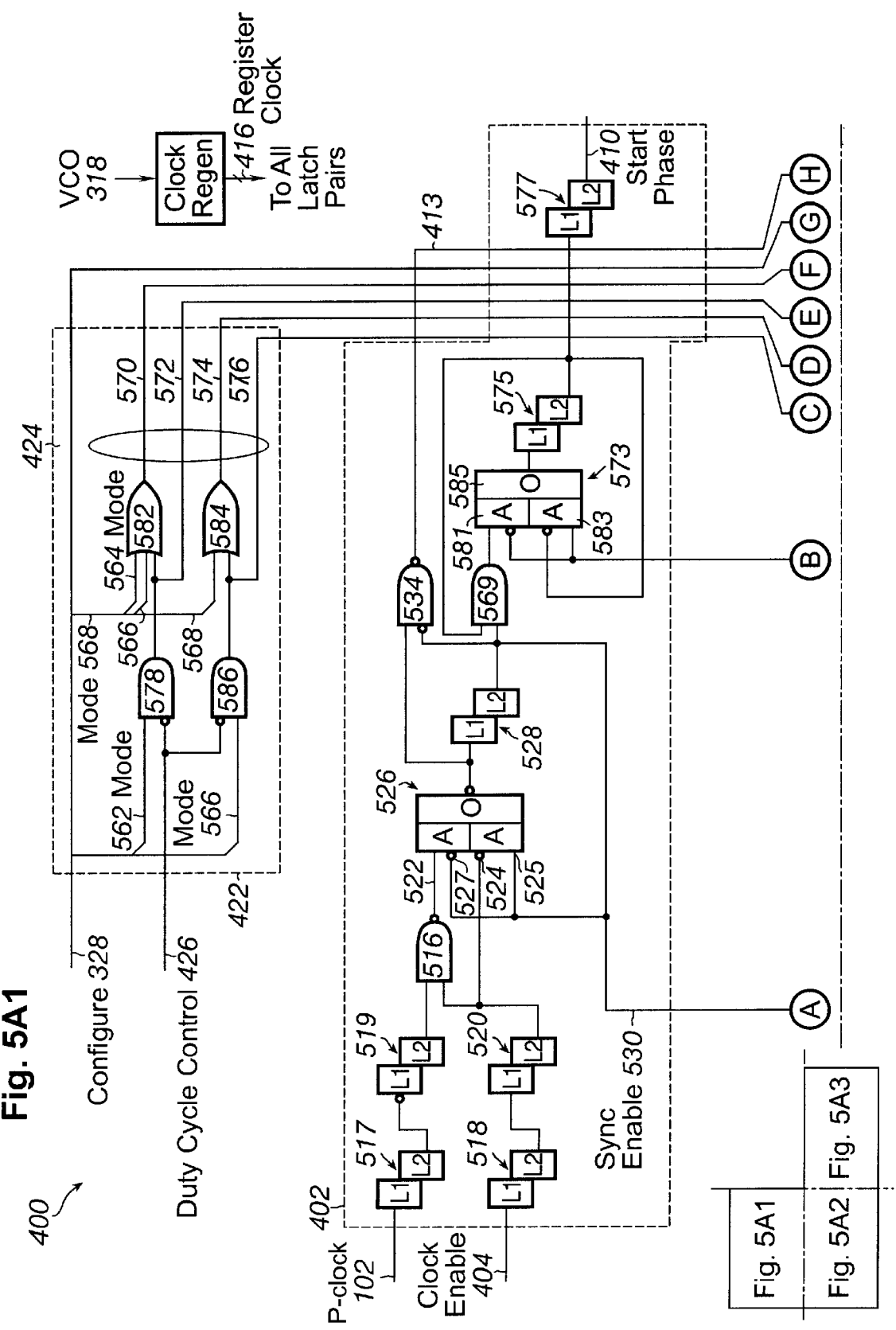
Fig. 5A1

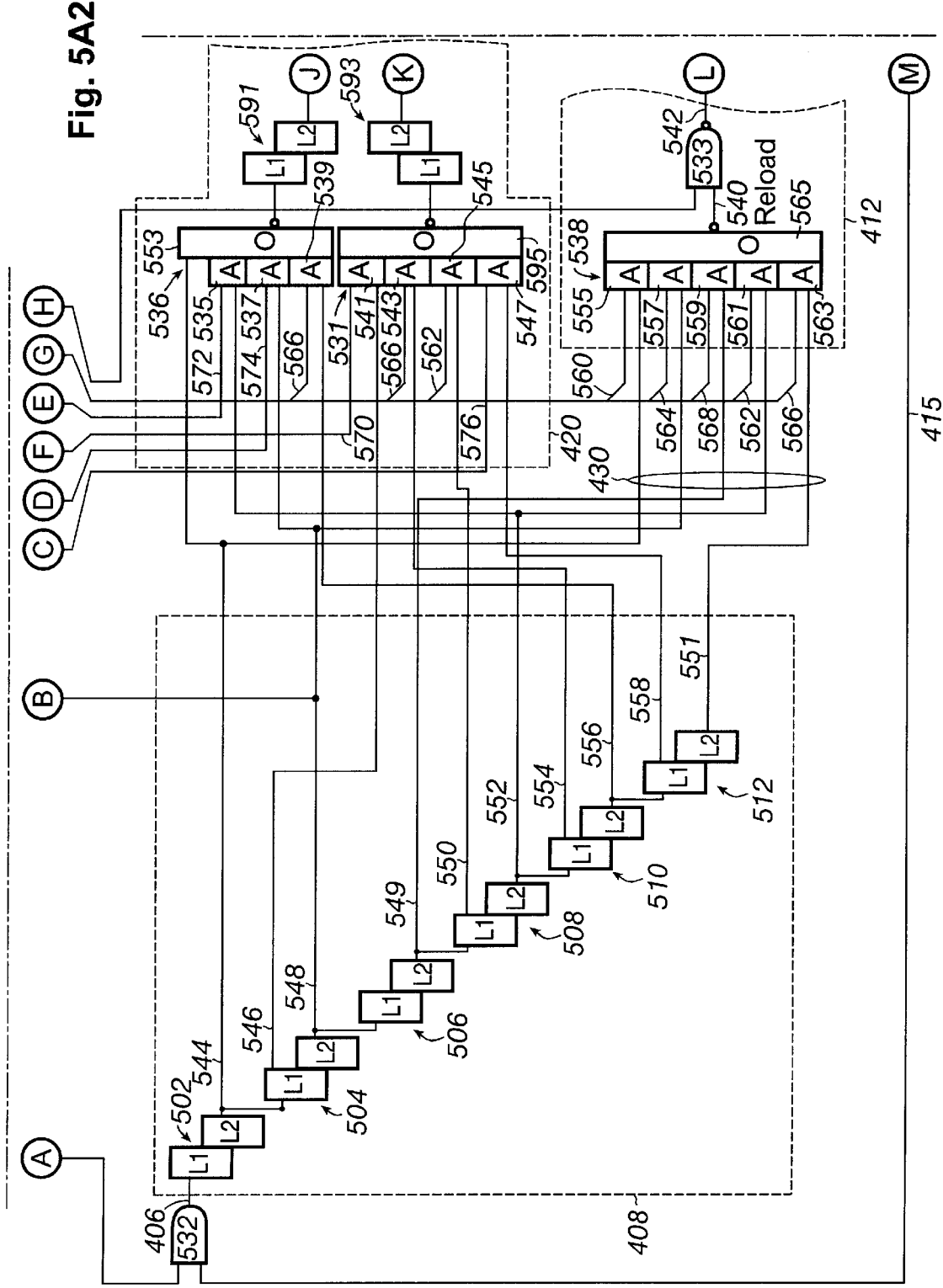
Fig. 5A2

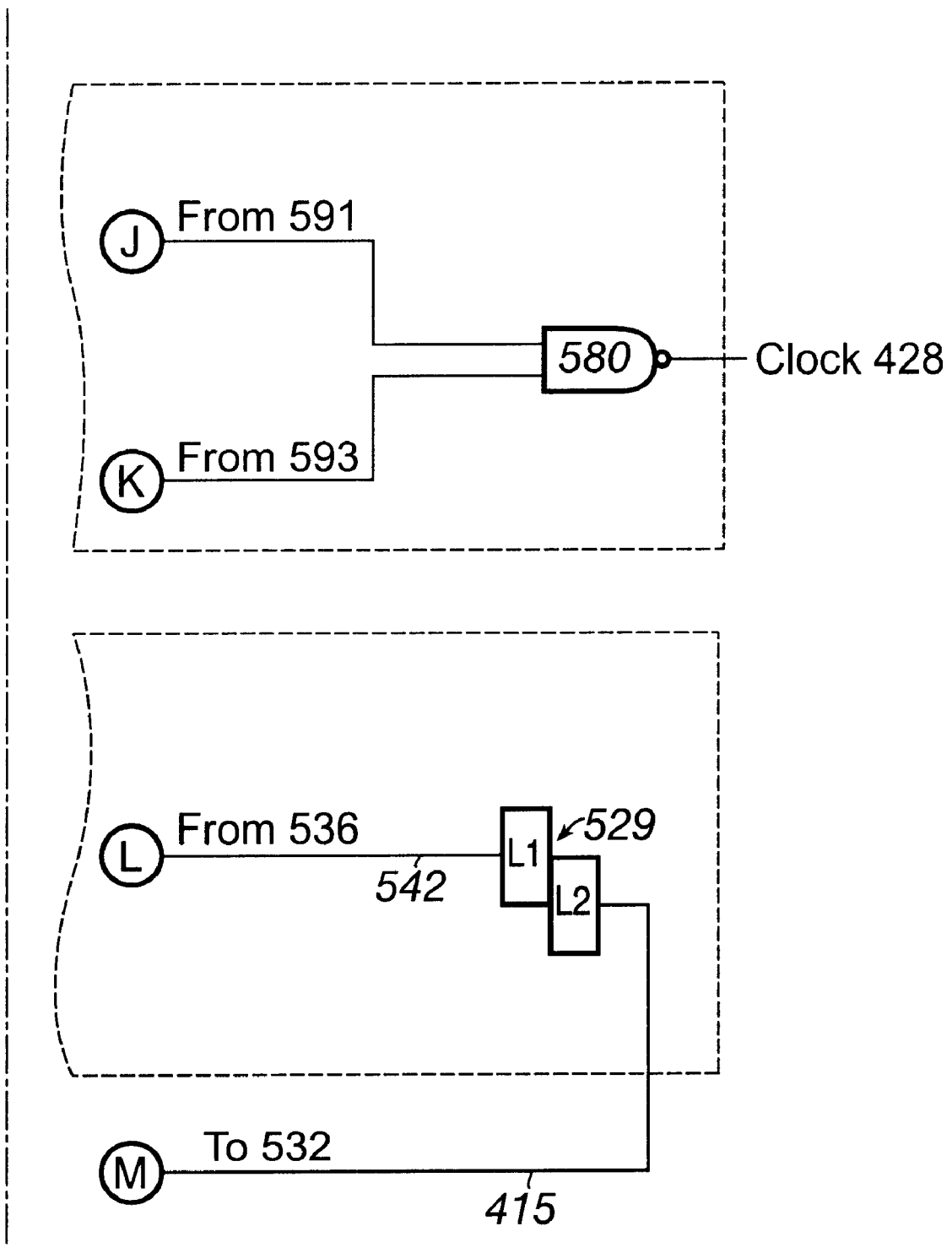
Fig. 5A3

MEMORY CLOCK GENERATOR AND METHOD THEREFOR

CROSS REFERENCE TO RELATED APPLICATION

The present application is related to the commonly owned co-pending U.S. patent application Ser. No. 09/377,632, entitled "Bus Interface Apparatus and Method Therefor" hereby incorporated herein by reference.

TECHNICAL FIELD

The present invention relates in general to data processing systems, and in particular, to the generation of memory clock signals for data processing systems having synchronous memory.

BACKGROUND INFORMATION

A processor chip (which may also be referred to as a central processing unit, or ("CPU") interfaces to off-chip memory for storage of data and instructions. Modem data processing systems typically employ, as off-chip random access memory synchronous random access memory (SRAM) in which memory transactions are synchronized to edges of a memory clock signal. The memory clock signal is provided by the CPU. An individual value to be stored in memory is asserted on the memory interface by the CPU for only a brief instant, timed by signals derived from the CPU's clock, which signals are also provided to the SRAM as the memory clock.

Conventionally, the values to be stored are transferred through latches to which the timing signals are applied. FIG. 1 illustrates a portion 100 of a CPU including prior art bus interface mechanisms. Processor clock ("p-clock") signal 102 is generated via a p-clock generator 104 and distributed throughout the processor chip through one or more p-clock distribution networks 106. (The p-clock is sometimes referred to as the "GCLK".) The clock 102 also provides a reference signal to a phase-locked loop (PLL) 108 that controls a voltage controlled oscillator (VCO) 110 that together generate memory clock 112 which is thereby derived from, and phase-locked to, p-clock 102.

Data transfers to memory are launched from, or transfers from memory are received at, diverse locations on the CPU chip, not merely in one central location. If data transfers were centralized, numerous problems would arise. These include noise from a concentration of near-simultaneous switching, wiring congestion and path length disparities for both the data and clock paths because some locations in the chip would be relatively more remote than others from the central data transfer location. Consequently, data transfers are decentralized, and data is distributed from its source via one or more data distribution networks 114, and stored in latch pairs, or registers, 116. Data is generated, and stored, in the processor clock domain.

Data to be stored in memory is distributed to the CPU chip boundary via data distribution networks 114, and launched onto memory bus 118. Data is launched in response to memory clock 112 via a plurality of latches 120 which incorporate a master-slave latch pair, denoted latch L1 and latch L2.

Although distributing data transfer locations on the CPU chip does mitigate the aforementioned problems, data signals are typically substantially skewed relative to the timing signals, for example memory clock 112, at the data transfer locations on the chip boundary. Furthermore, the amount of skew may vary due to the variation in path lengths for the data and timing signals, which variation may be substantial. This is illustrated in the timing diagram in FIG. 1B. In the embodiment illustrated in FIG. 1B, data 122 input to latch 120 is latched on a rising edge of memory clock 112. Portions "A", "B", and "C" are launched at edges $t_1$, $t_2$, and $t_3$, respectively. Due to the skew, $T_s$, in the arrival times of data 122 and the corresponding edge of memory clock 112, a center of the data valid interval for data 122 is shifted relative to the edges of memory clock 112. As a consequence, data 122 has excessive setup time, $T_{su}$ and short hold-up time, $T_h$. If the hold-up time becomes too short, shorter than the hold-up time specified by the manufacturer of the SRAM, the memory write may result in erroneous data being stored in memory.

Conventionally, the skew problem has been addressed by tuning of the electrical characteristics associated with the conduction paths to adjust effective path lengths. In this way, the skew of the data and timing signals at the data transfer points on the CPU boundary are controlled. However, advances in CPU technology make this conventional approach increasingly problematic. Higher frequency operation, smaller conductor cross-sections, smaller separation between conductors, and longer conduction paths all exacerbate the limiting of the signal skew using conventional approaches. Moreover, as CPU speeds increase, bus clocks speeds become more important in determining the overall performance of the data processing system. Thus, bus clock speeds must increase in order to keep pace with the increase in CPU performance. This trend in bus clock speeds further increases the constraints on data and timing signals skew. Thus, there is a need in the art for apparatus and methods that mitigate the skew in the data and timing signals in data transfers to memory in data processing systems, as well as mitigating sensitivities to sources of skew arising from manufacturing processes and CPU operation.

SUMMARY OF THE INVENTION

The aforementioned needs are addressed by the present invention. Accordingly, there is provided, in a first form, a memory clock generator. The clock generator contains a shift register operable for inputting a first clock signal, the shift register having a predetermined first set of output taps. The generator also includes first logic circuitry operable for receiving signals from the first set of outputs and a plurality of control signals operable for selecting a ratio of a period of the memory clock to a period of the first clock. The first logic circuitry outputs a second clock signal, the memory clock being output in response to the second clock signal.

There is also provided, in a second form, a method of generating a memory clock. The method includes the steps of shifting a first pulse of a first clock signal through a shift register, and tapping a first predetermined set of outputs off of the shift register. The output signals from the first set of outputs are logically combined with a first plurality of first control signals, wherein the first plurality of first control signals are operable for selecting a ratio of a period of the memory clock to a period of the first clock signal. The memory clock is generated in response to the result of the logical combination.

Additionally, there is provided, in a third form, a data processing system including a central processing unit (CPU), the CPU including a memory clock generator, and a memory operable for storing data and instructions for the CPU. The memory communicates the data and instructions in response to a memory clock from the memory clock generator. The memory clock generator contains a shift register operable for inputting a first clock signal, the shift register having a predetermined first set of output taps, and first logic circuitry operable for receiving signals from the first set of output taps and a plurality of control signals operable for selecting a ratio of a period of the memory clock to a period of the first clock. The first logic circuitry outputs a second clock signal, the memory clock being output in response to the second clock signal.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 5A illustrates, in partial schematic form, a memory clock generator in accordance with an embodiment of the present invention;

DETAILED DESCRIPTION

Figure 1A:
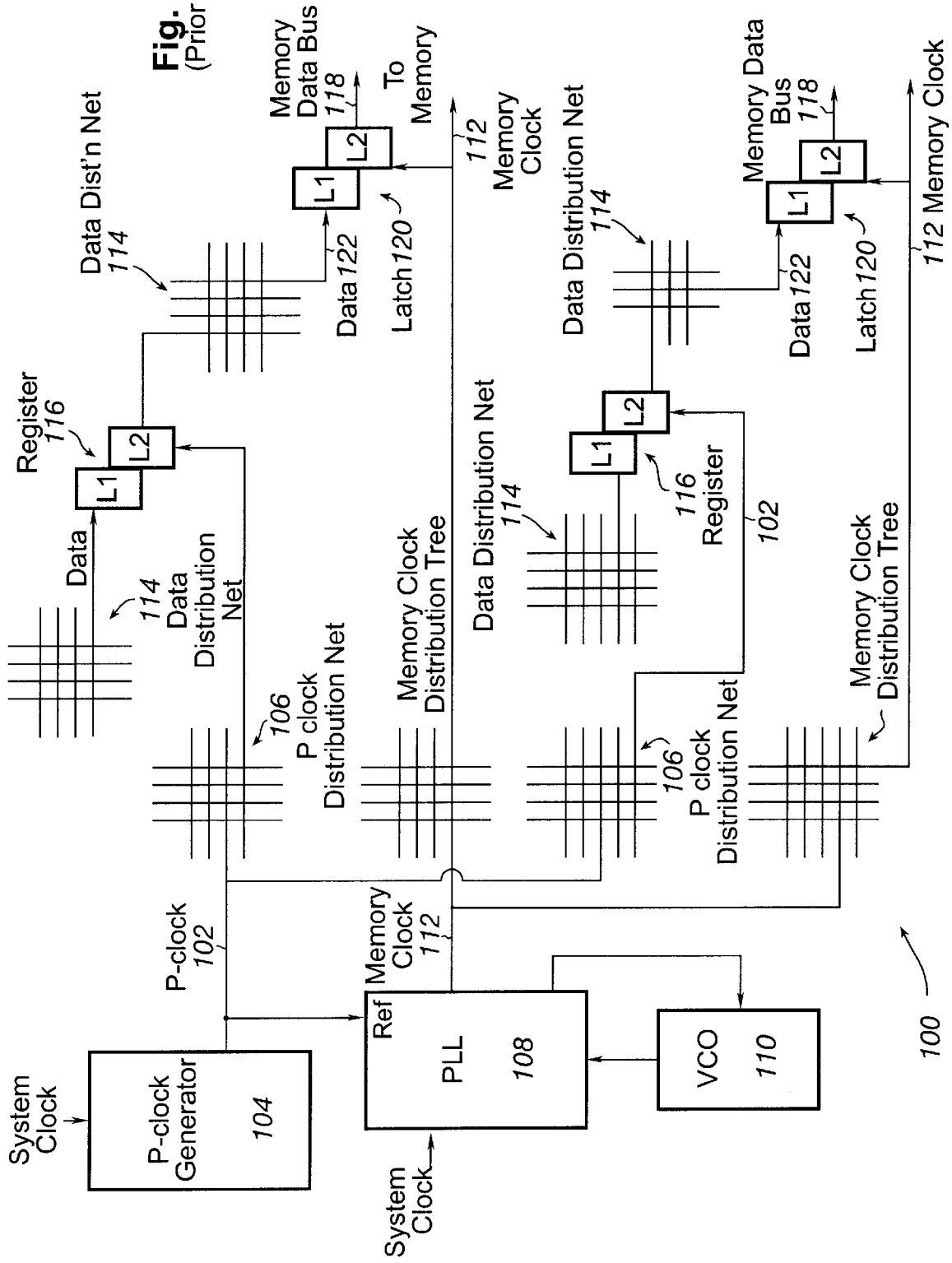
FIG. 1A illustrates, in block diagram form, a portion of a central processing unit (CPU) in accordance with the prior art.
Figure 1B:
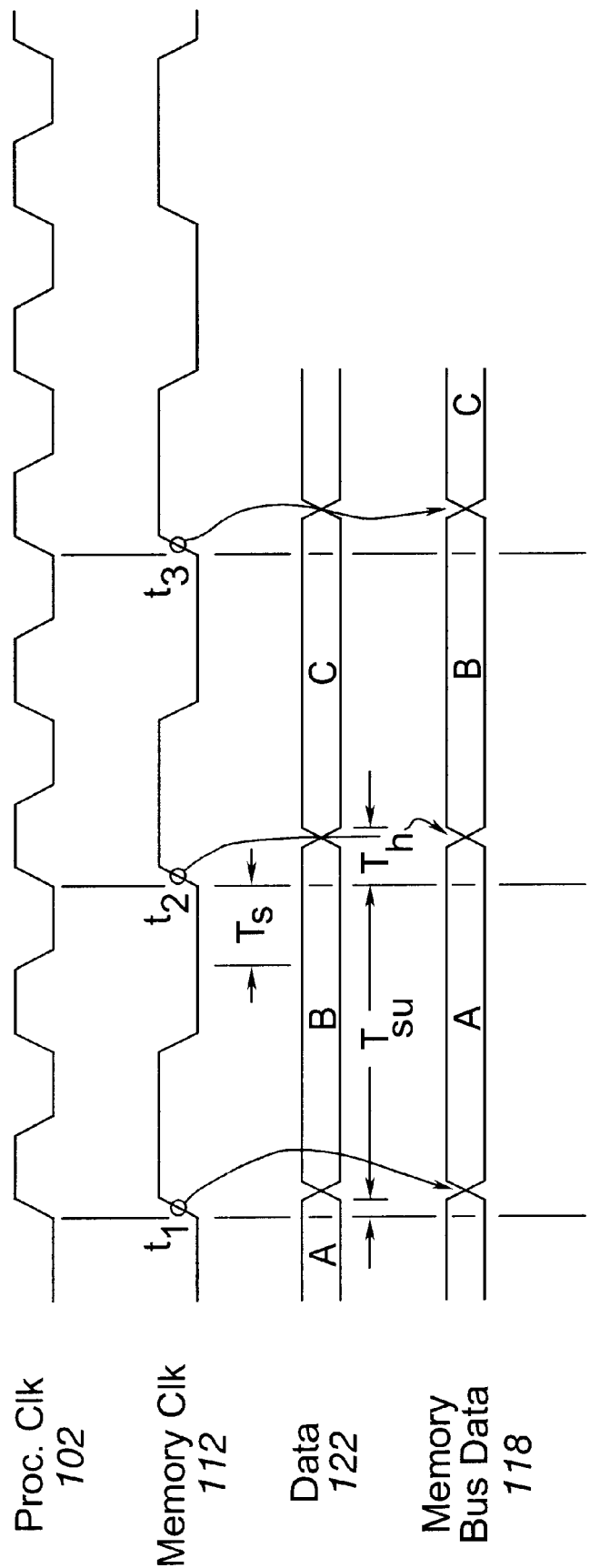
FIG. 1B schematically illustrates a timing diagram in accordance with the prior art CPU of FIG. 1A.

A memory clock generator mechanism is provided. The mechanism derives a memory clock from the processor clock, in open loop fashion. The processor clock (which may be referred to as the "p-clock" or "GCLK") is gated into a shift register. Outputs tapped off the shift register are combined in combinatoric logic with a plurality of select signals to provide a memory clock. The select signals are derived from configuration information, and accommodate a plurality of predetermined ratios of memory bus clock periods to p-clock periods. The memory clock mechanism of the present invention may be started asynchronously, and also provides a signal to other portions of the central processing unit (CPU) that indicates to the CPU that the memory clock has started.

In the following description, numerous specific details are set forth, such as specific clock frequency ratios, etc., to provide a thorough understanding of the present invention. However, it will be obvious to those skilled in the art that the present invention may be practiced without such specific details. In other instances, well-known circuits have been shown in block diagram form in order not to obscure the present invention in unnecessary detail. Furthermore, during a description of the implementation of the invention, the terms "assert" and "negate" and various grammatical forms thereof, are used to avoid confusion when dealing with the mixture of "active high" and "active low" logic signals. Assert is used to refer to the rendering of a logic signal or register bit into its active, or logically true, state. Negate is used to refer to the rendering of a logic signal or register bit into its inactive, or logically false, state.

Refer now to the drawings wherein depicted elements are not necessarily shown to scale and wherein like or similar elements are designated by the same reference numeral through the several views.

Figure 2:
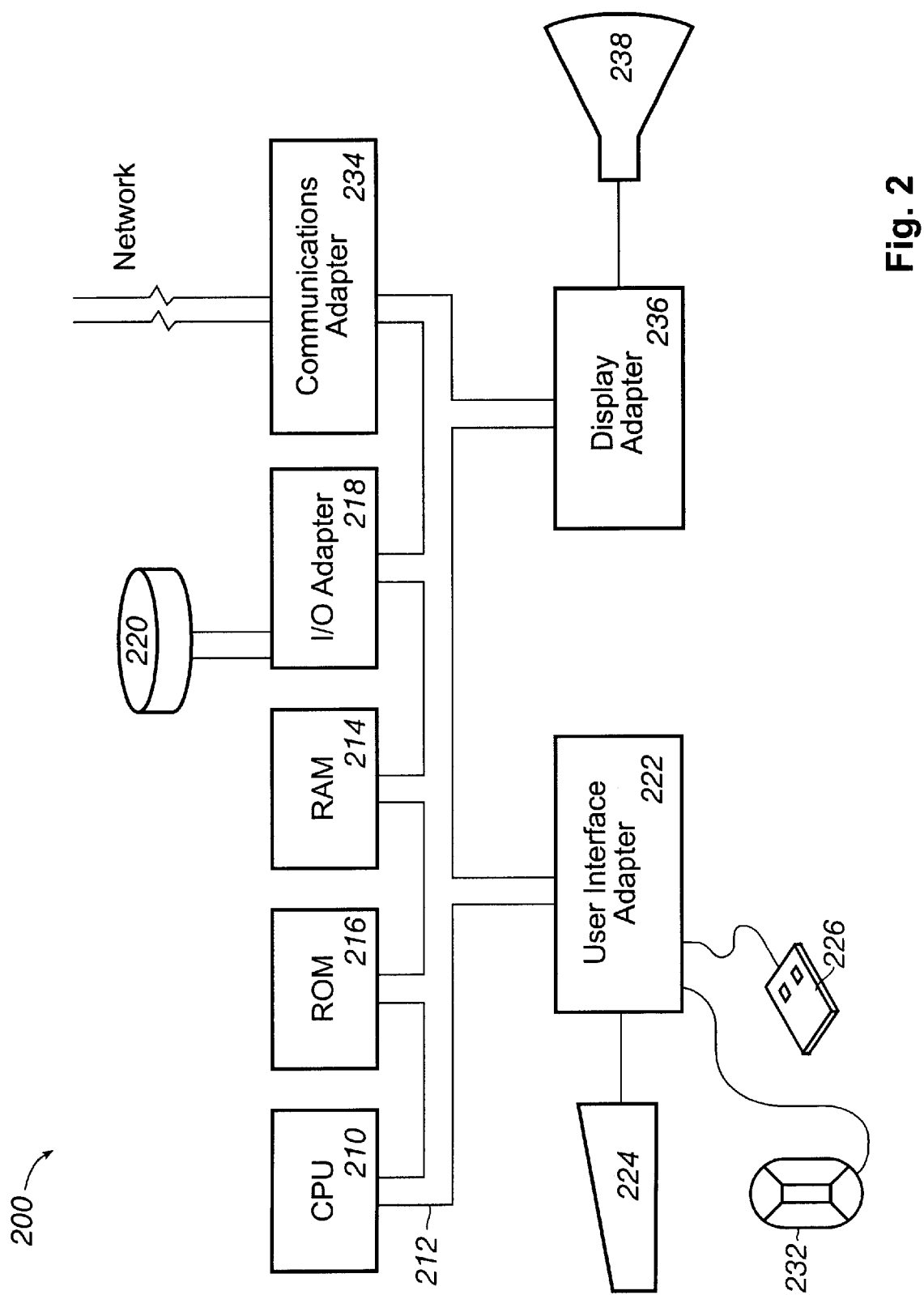
FIG. 2 illustrates, in block diagram form, a data processing system in accordance with an embodiment the present invention.

Referring first to FIG. 2, an example is shown of a data processing system 200 which may be used for the present invention. A representative hardware environment for practicing the present invention is depicted in FIG. 2, which illustrates a typical hardware configuration of data processing system 100 in accordance with the subject invention having central processing unit (CPU) 210, incorporating the memory clock generator of the present invention, and a number of other units interconnected via system bus 212. Data processing system 100 includes random access memory (RAM) 214, read only memory (ROM) 216, and input/output (I/O) adapter 218 for connecting peripheral devices such as disk units 220 to bus 212, user interface adapter 222 for connecting keyboard 224, mouse 226, trackball 232, and/or other user interface devices such as a touch screen device (not shown) to bus 212, communication adapter 234 for connecting data processing system 100 to a data processing network, and display adapter 236 for connecting bus 212 to display device 238. CPU 210 may include other circuitry not shown herein, which will include circuitry commonly found within a microprocessor, e.g., execution unit, bus interface unit, arithmetic logic unit, etc. CPU 210 may also reside on a single integrated circuit. Additionally, an operating system is used to coordinate the functions of the components of FIG. 2.

Figure 3:
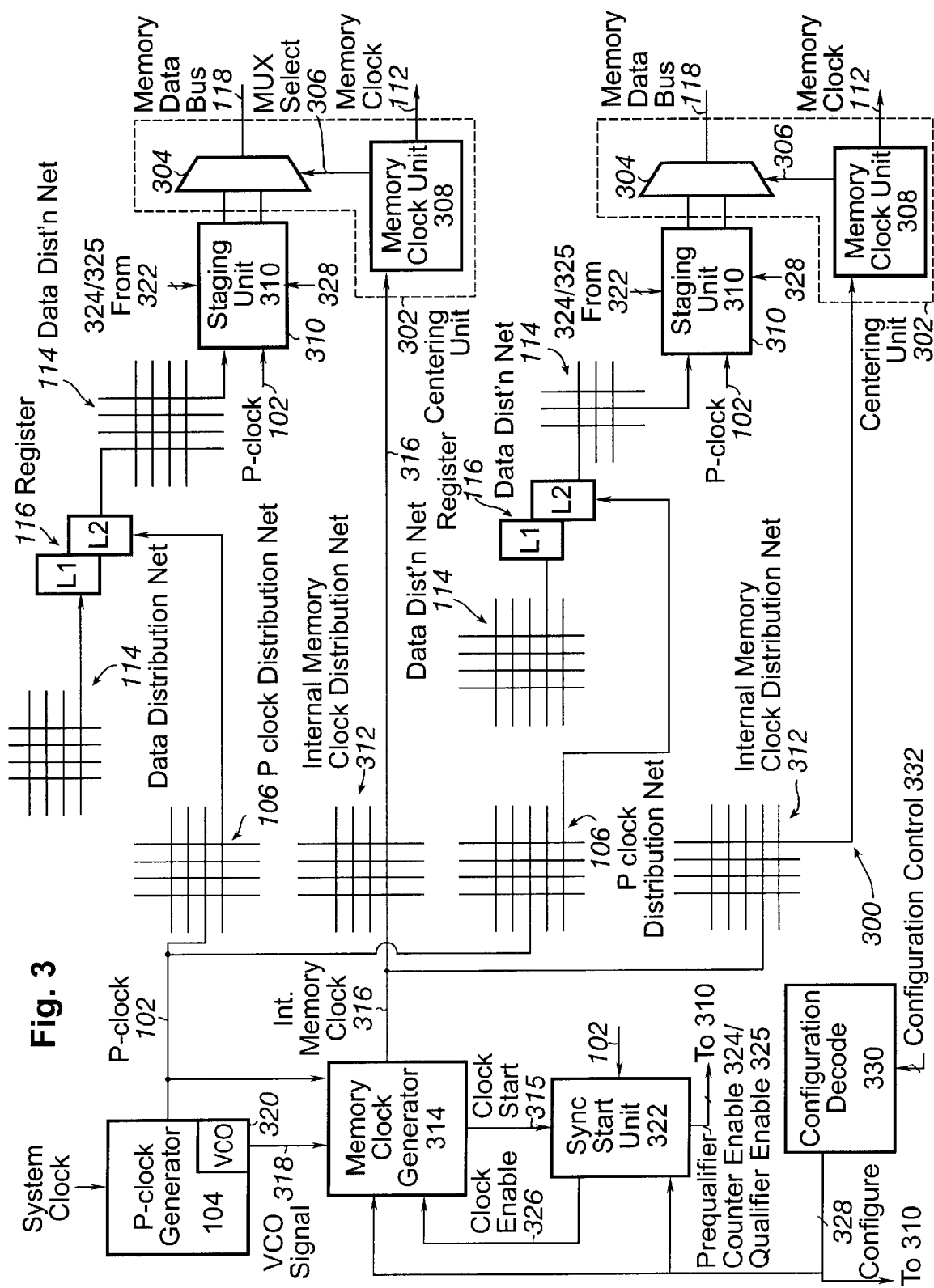
FIG. 3 illustrates, in block diagram form, a portion of a CPU in accordance with an embodiment of the present invention.

FIG. 3 illustrates the portion 300 of a CPU in accordance with an embodiment of the present invention. Data is loaded into memory via a plurality of centering units 302. Each centering unit 302 includes a multiplexer (MUX) 304 which selects between a pair of inputs in response to MUX select 306 from memory clock unit 308. The multiplexer inputs are coupled to staging unit 310. Staging unit 310 receives the data stream to be loaded in the memory via data distribution nets 114.

Each memory clock unit 308 is coupled to an internal memory clock distribution net 312. Portion 300 may include a plurality of internal memory clock nets 312.

The internal memory clock is generated by memory clock generator 314 which outputs internal memory clock 316. Memory clock generator 314 receives p-clock 102 as well as VCO signal 318 from VCO 320. VCO signal 318 is used to clock latches within memory clock generator 314, as described further below. Synchronous ("sync") start unit 322 provides a qualifier counter enable signal 324 to staging units 310. Additionally, synchronous start unit 322 also sends enable 326 to memory clock generator 314 to start the memory clock. Configure signal 328 sets a ratio between the period of internal memory clock 316 and p-clock 102. Configure 328 is provided by configuration decode 330 in response to configuration control signal 332. In an embodiment of the present invention, configuration control 332 may be a three-bit signal and configuration decode 330 may be a one-of-five decoder in which a corresponding one of configure 328 represents a processor clock ratio of two times, two and one-half times, three times, three and one-half times, and four times. Sync start unit 322, and staging units 310 are described in detail in the commonly owned, co-pending U.S. patent application Ser. No. 09/377,632, entitled "Bus Interface Apparatus and Method Therefor", incorporated herein by reference.

Figure 4:
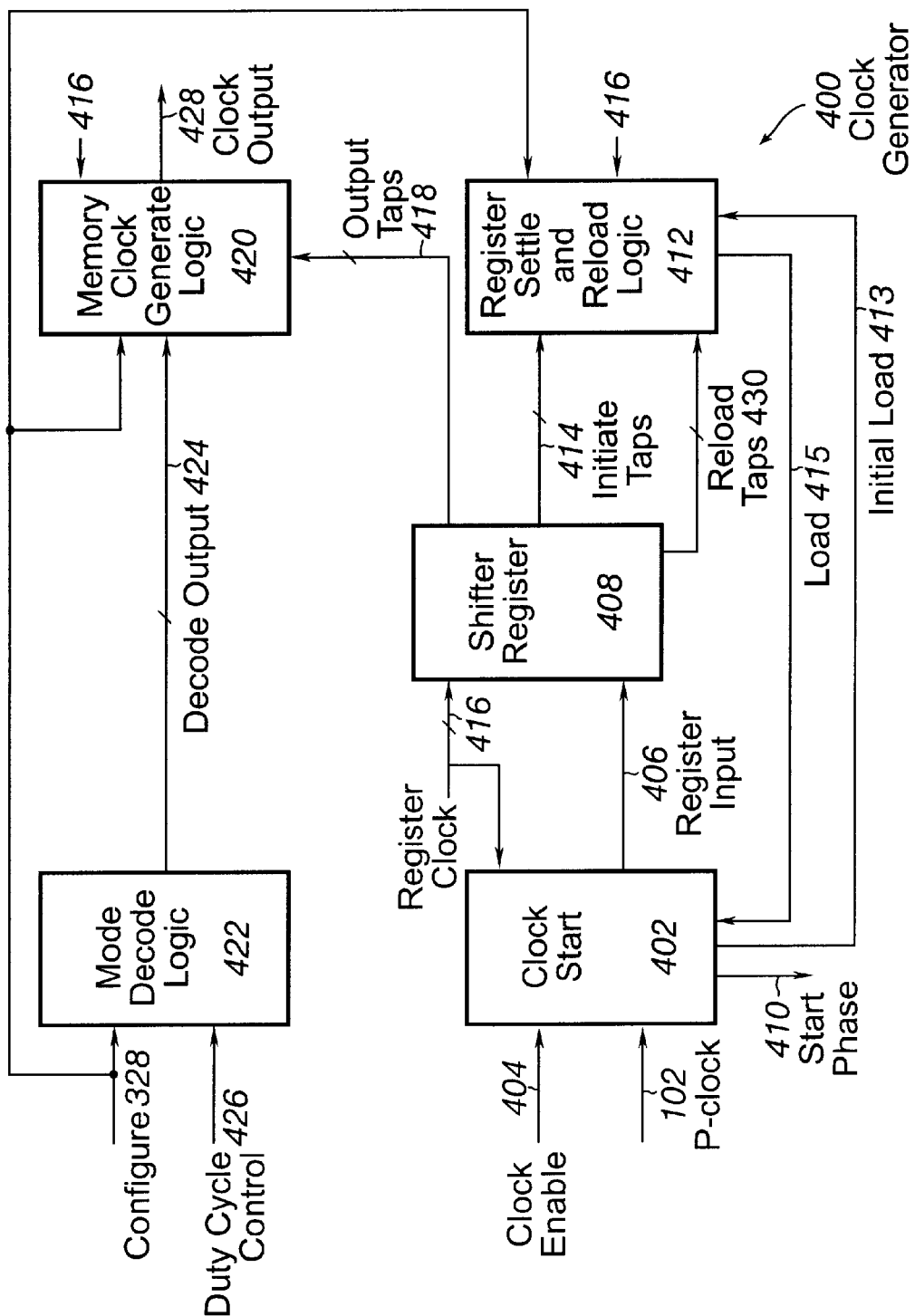
FIG. 4 illustrates, in block diagram form, a memory clock generator in accordance with an embodiment of the present invention.

Refer now to FIG. 4 illustrating memory clock generator 400 in accordance with an embodiment of the present invention. Clock generator 400 may be asynchronously started via clock start unit 402 in response to clock enable 404. While clock enable 404 is negated, memory clock generator 400 is held, and on assertion of clock enable 404, memory clock generator 400 is initiated. Clock enable 404 may be provided by synchronous start circuitry within the CPU, such as sync start unit 322, in the CPU embodiment illustrated in FIG. 3, wherein clock enable 404 is provided by enable 326, FIG. 3. Sync start unit 322 is described in detail in the aforementioned commonly owned co-pending U.S. Patent Application. Clock start unit 402 also receives p-clock 102, and outputs register input 406 to shift register 408. Clock start unit 402 also outputs start phase signal 410 to remaining portions of the CPU. Start phase 410 informs circuitry within the CPU that memory clock generator 400 has started. In an embodiment of a CPU incorporating the memory clock generator of the present invention, for example, a CPU including portion 300 in FIG. 3, clock start signal 315, FIG. 3, may be provided by start phase 410 of memory clock generator 400.

In response to the assertion of clock enable 404, clock start unit 402 generates register input 406. On startup of clock generator 400, clock start unit 402 also asserts initial load 413 in response to which reload logic 412 asserts load 415. Note that in an embodiment of the present invention, initial load 413 may be active "low." The signal on register input 406 is propagated through shift register 408 in response to register clock 416. Output taps 418 provide signals to memory clock generate logic 420. Output taps 418 are tapped off of a first set of shift register stages. Memory clock generate logic 420 also receives configure 328, which includes a plurality of data bits. Configure 328 is also provided to mode decode logic 422. Decode output signals 424 are also coupled to memory clock generate logic 420. Decode output signals 424 and configure 328 are used by memory clock generate logic 420 to generate a memory clock having a period that is a preselected multiple of the p-clock period.

Mode decode logic 422 also receives duty cycle control 426. The set of ratios of the memory clock period to p-clock period provided by memory clock generator 400 may include non-integer values. For such ratios, the duty cycle of clock output 428 is asymmetric. In other words, the "high" intervals of output 428 may not be equal to the "low" intervals. As a consequence, the data valid window may be skewed with respect to the memory clock. Duty cycle control 426 permits the asymmetry in clock output 428 to be shifted by one phase of register clock 416, the minimum granularity of memory clock generator 400. This permits the skew between the memory clock and valid data window to be adjusted accordingly. A data value of Duty cycle control 426 may be provided by a special purpose register in an embodiment of a CPU incorporating memory clock generator 400, which register may be set by the operating system, for example.

In response to configure signals 328, decode output 424 and output taps 418, memory clock generate logic 420 generates clock output 428. Clock output 428 may provide a clock signal having a frequency that is a multiple of the frequency of the memory bus clock. The memory clock may be generated by inputting clock output 428 to a divider circuit, which circuits are well known in the data processing art. In an embodiment of a CPU incorporating a memory clock in accordance with the present invention, for example, a CPU including portion 300 in FIG. 3, clock output 428 constitutes internal memory clock 316, and the memory clock 317 is generated by memory clock unit 308, including the aforementioned divider circuitry. A memory clock unit such as memory clock unit 308 in FIG. 3, in which the divider constitutes a divide-by-two circuit, is described in detail in the aforesaid commonly owned co-pending U.S. patent application Ser. No. 09/377,632, entitled "Bus Interface Apparatus and Method Therefor", incorporated herein by reference.

After register input 406 propagates through a preselected number of stages of shift register 408, reload logic 412 reloads shift register 408 with the next register input 406 by reasserting load 415. The stage in shift register at which reload occurs is selected in response to the state of configure signals 328, or, in other words, the selected ratio of memory clock period to p-clock period. For a preselected clock ratio, reload logic 412 gates the next register input 406 in response to a corresponding state of reload taps 430.

Memory clock generator 400 may be further understood by referring now to FIG. 5A, illustrating memory clock generator 400 in further detail. In the memory clock generator embodiment of FIG. 5A, shift register 408 includes a plurality of cascaded latch pairs, 502, 504, 506, 508, 510, and 512, wherein an output of a preceding latch pair is coupled to an input of a succeeding latch pair. Each of latch pairs 502–512 is clocked by register clock 416, not shown in FIG. 5A, for simplicity.

Figure 5B:
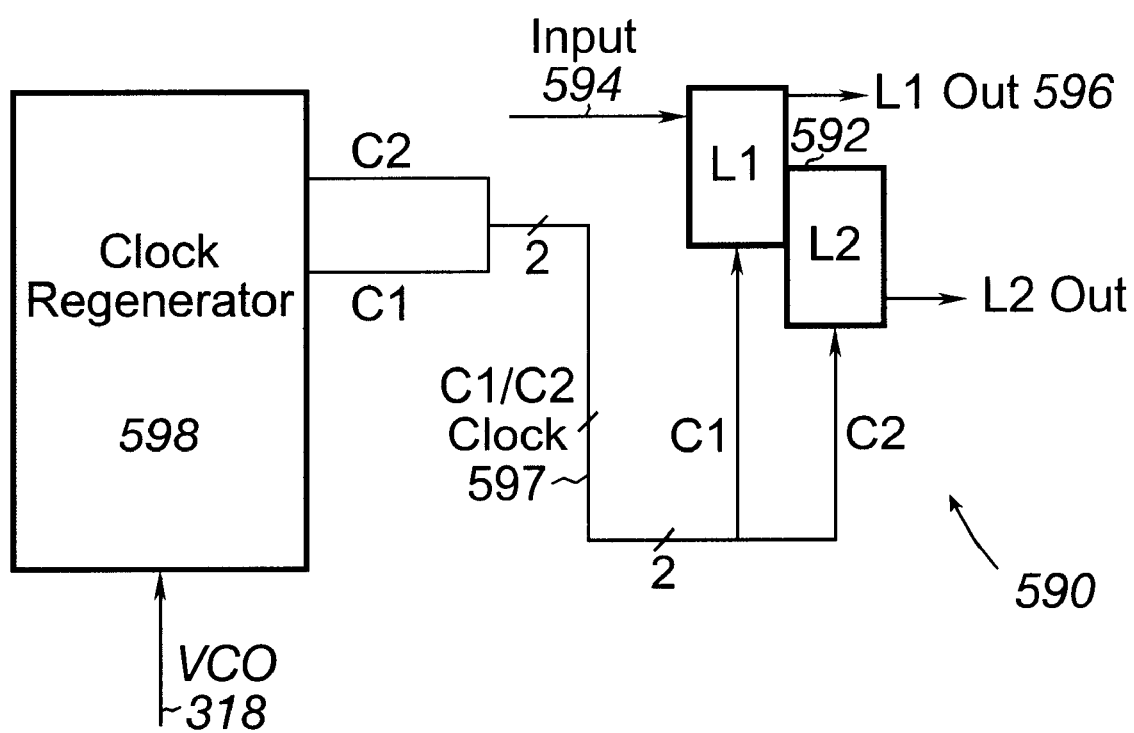
FIG. 5B illustrated, in block diagram form, a clock regenerator and latch pair which may be used in an embodiment of the present invention.

In FIG. 5B, a typical latch pair and clock configuration 590 is illustrated. Latch pair 592 includes a latch L1 and a latch L2. Data is input to latch pair 592 in input 594 in the L1 latch. Data is output from the L1 latch on L1 out. L1 out 596 is also internally connected to an input into the L2 latch, which input is not available external to latch pair 592, and thus, is not labeled in FIG. 5B. Data is output from the L2 latch on L2 out. The L1 latch and the L2 latch are clocked by clocks C1 and C2, respectively. The C1 and C2 clocks are collectively denoted C1/C2 clock 597. The C1 and C2 clocks are provided by clock regenerator 598, and are derived from a reference signal, which in the embodiment of the present invention in accordance with FIG. 3 is provided by VCO signal 318, which signal may have a frequency twice that of p-clock 102. The C1 and C2 clocks have opposite phase, and in an embodiment of the present invention, the C2 clock may have the phase of VCO signal 318. However, it would be understood by an artisan of ordinary skill that an alternative embodiment of the present invention could be implemented in which C2 be shifted by 180°. Such an embodiment would be within the spirit and scope of the present invention. In another alternative embodiment, latch pair 592 may be an edge-triggered master-slave latch, which, as would be understood by an artisan of ordinary skill, would be clocked by a single clock line. Returning to FIG. 5A, register clock 416 constitutes a C1/C2 clock pair derived from VCO signal 318 in FIG. 3, similar to C1/C2 clock 597 in FIG. 5B.

As previously discussed, memory clock generator 400 starts when clock enable 404 is asserted. Clock enable 404 may be asserted asynchronously, and latch pairs 518 and 520 introduce a delay of between one and two VCO cycles (depending on the phase of enable 404 relative to VCO signal 318 after which NAND gate 516 is controlled by p-clock 102, delayed and inverted by latch pairs 517 and 519. (Note that an input to latch pair 519 is an inverting input.) Latch pairs 517 and 519 are clocked by register clock 416 as are all other latch pairs in clock generator 400. (The explicit connections of register clock 416 to the latch pairs are omitted from the drawing for clarity.) In steady state, prior to the assertion of clock enable 404, input 522, coupled to an output of NAND gate 516 and input 524, which is inverting, coupled to an output of latch pair 520, in AND-OR logic 526 are both asserted. Input 524 is asserted as a consequence of the negation of the output of latch pair 520, and the inversion thereof by input 524. Thus, an output of AND-OR logic 526, which is also inverting, is negated. Latch pair 528 is coupled to the output of AND-OR 526 and holds the negated state thereof. An output of latch pair 528 provides synchronous ("sync") enable 530. Sync enable 530 is fed back to a second pair of inputs into the AND portions of AND-OR logic 526, input 525 and input 527, an inverting input. Thus, AND-OR logic 526 is effectively a multiplexer (MUX) controlled by sync enable 530. Thus, in steady state, prior to assertion of enable 404, the action of sync enable 530 through AND-OR logic 526 retains the steady state condition, and sync enable 530 also holds off initiation of memory clock generator 400, via AND gate 532.

Figure 6:
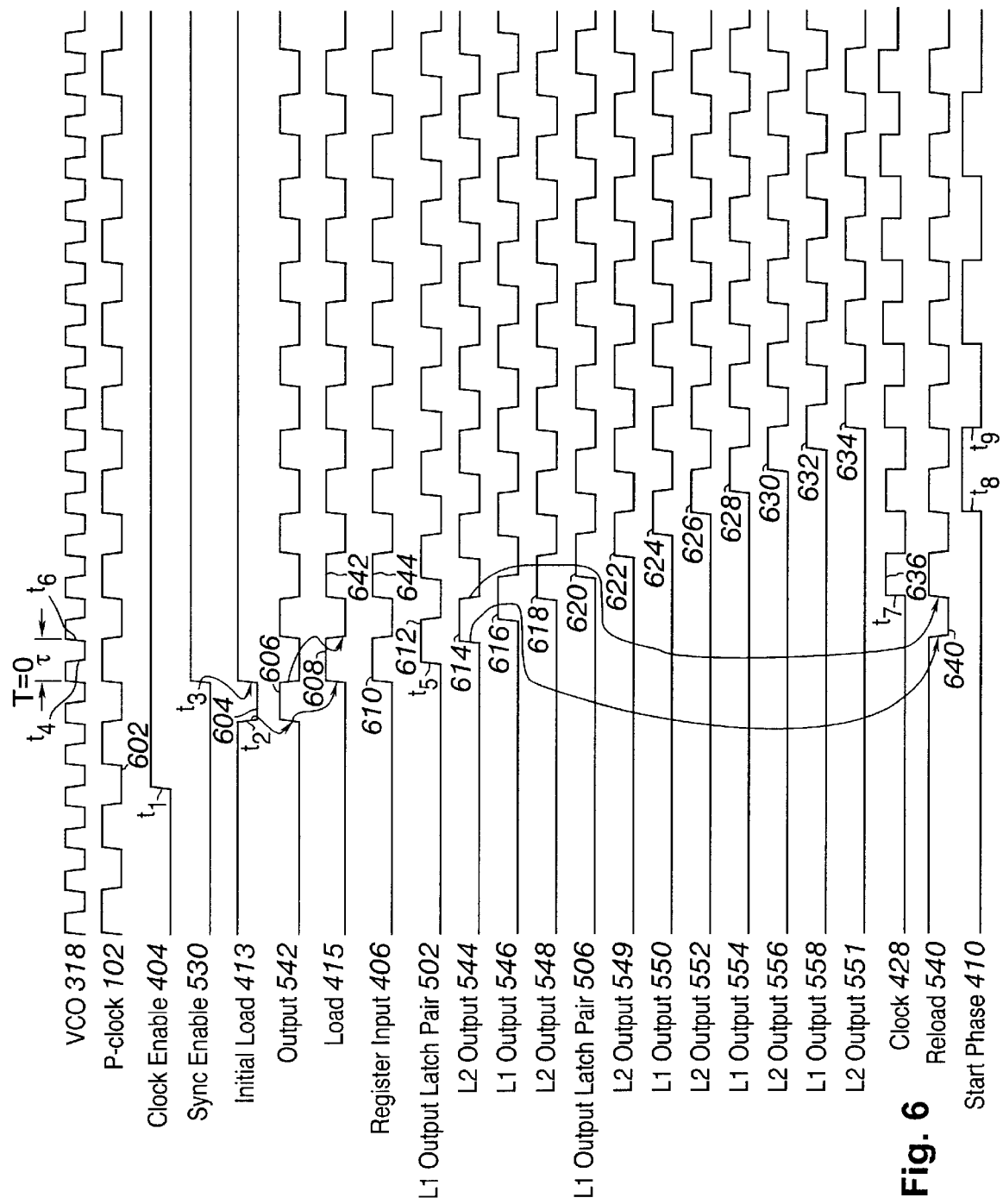
FIG. 6 schematically illustrates a timing diagram for a memory clock generator in accordance with an embodiment of the present invention.

Upon assertion of clock enable 404, a pulse is generated on register input 406, via the action of NAND gate 516, AND-OR logic 526, and latch pair 528 and NAND gate 534 which generates a pulse on initial load 413. This may be understood by referring to FIG. 5A in conjunction with the timing diagram illustrated in FIG. 6. The timing diagram in FIG. 6 is directed to an embodiment in which the ratio of memory clock period to p-clock period is two, however, the startup of clock generator 400 is independent of the ratio of memory clock period to p-clock period. Following the delay introduced by latch pairs 518 and 520, the transition of clock enable 404, labeled $t_1$ in FIG. 6, appears at a first input of NAND gate 516. The output of gate 516 is then controlled, as previously described, by p-clock 102, and, in particular, the state of a second input of NAND gate 516, coupled to an output of latch pair 519, is determined by the state of p-clock 102 at the time of the occurrence of edge $t_1$, because of the delays introduced by latch pairs 517 and 519. Additionally, the signal at the second input of NAND gate 516 is the complement of the value of p-clock 102 at the time of the transition of clock enable 404 because of the inverting input in latch pair 519. This signal is inverted again at the output of NAND gate 516, and coupled to input 522 in AND-OR logic 526. Because sync enable 530 is negated, this signal, derived from p-clock 102, controls the output of AND-OR logic 526, which inverts, at its output, the signal at input 522. Thus, flattop 602 in p-clock 102, corresponding to the time of transition of clock enable 404, undergoes three inversions, and is therefore asserted at the output of AND-OR logic 526. The output of AND-OR logic 526 is coupled to a first input of gate 534. Because, through the action of latch pair 528, sync enable 530 is still negated, the transition of the output of AND-OR logic 526 by the opening of gate 516 asserts initial load 413, at the output of gate 534, transition $t_2$. In an embodiment of the present invention, initial load 413 may be active "low". After a delay of $\tau$, corresponding to one cycle of VCO signal 318, the signal at the output of AND-OR logic 526 is clocked through latch pair 528, asserting sync enable 530, transition $t_3$, FIG. 6. Sync enable 530 is also coupled to a second, inverting, input to gate 534. Thus, transition $t_3$ negates the output of gate 534, initial load 413, forming the trailing edge of the initial load pulse 604, having a width of $\tau$.

Initial load 413 is coupled to a first input of NAND gate 533. A second input of NAND gate 533 is coupled to an output of AND-OR logic 538, which is used to generate a reload pulse 540, as described further below. On startup of memory clock 400, all of the signals on reload taps 430 are negated. Consequently, reload 540, at an inverting output of AND-OR logic 538, which, in an embodiment of the present invention, may be active "low", is also negated. Thus, NAND gate 533 is controlled by initial load 413, and pulse 604 is inverted at output 542 of NAND gate 533, forming pulse 606, FIG. 6. Pulse 606 is delayed by $\tau$ in latch pair 529, generating pulse 608 on load 415, which is then coupled to NAND gate 532. Because sync enable 530 has been asserted at transition $t_3$, an output of gate 532 is controlled by load 415, and load 415 generates an initial pulse 610 on register input 406. This pulse is propagated through latch pairs 502–512, constituting shift register 408.

In the embodiment of memory clock generator 400 in FIG. 4, memory clock generate logic 420 includes AND-NOR logic 536 including a plurality of AND gates 535–539, outputs of which are input to NOR gate 553, an output of which is used to generate clock output 428. Additionally, an input of NOR gate 553 is coupled to output 544 of latch pair 502. Clock generate logic 420 also contains AND-NOR logic 531 having a plurality of AND gates 541–547, outputs of which are input to NOR gate 595, an output of which is also used to generate clock output 428.

A plurality of outputs from a set of latch pairs 502–512 are coupled to respective inputs of the AND gates in AND-NOR logic 536 and 531. Collectively, these constitute output taps 418, FIG. 4. Output 546 from latch pair 504 is coupled to a first input of AND gate 541. A first input of AND gate 537 is coupled to output 548 of latch pair 504. Output 550 from latch pair 508 is coupled to a first input of AND gate 545, and output 552 from latch pair 508 is coupled to a first input of AND gate 535. A first input of AND gate 543 receives output 554 from latch pair 510, and a first input of AND gate 539 receives output 556 from latch pair 510. Output 558 from latch pair 512 is coupled to a first input of AND gate 547.

Second inputs of each of AND gates 535–547 receive signals determined in response to the preselected ratio of the memory clock period to the period of the p-clock. A clock ratio is selected by asserting one of mode signals 560, 562, 564, 566, and 568 collectively constituting configure signal 328. Mode signals 560–568 may be defined by loading a corresponding data value in a special purpose register in an embodiment of a CPU incorporating memory clock generator 400, which register may, for example, be set by the operating system. In an embodiment of the present invention, these may correspond to clock ratios of two times, two and one-half times, three times, three and one-half times, and four times, respectively. The second input of AND gate 537 is coupled to an output of OR gate 584, decode 574. Mode signal 562 is coupled to the second input of AND gate 545, and the second input of AND gates 539 and 543 receive mode signal 566. Additionally, the second inputs of AND gates 535 and 541 are coupled to decodes 572 and 570, respectively. The second input of AND gate 547 receives decode 576. Collectively, decodes 570–576 form decode output 424.

Decodes 570–576 are generated by mode decode logic 422 in response to mode signals 562–568 and duty cycle control 426. Decode 570 is generated by OR gate 582 which receives mode signal 564 and 566 on first and second inputs. A third input in OR gate 582 is obtained as an output of AND gate 578, which outputs the logical AND of mode signals 562 and the complement of duty cycle control 426. Decode 572 is provided by the output of AND gate 578. OR gate 584 outputs decode 574 as the logical OR of mode signal 568 and an output of AND gate 586, which ANDs mode signal 566 with the inverse of duty cycle control 426.

The timing associated with the propagation of one pulse through shift register 408 is also shown in FIG. 6. Outputs are further designated, in FIG. 6, as the L1 output and L2 output for the respective latch pair 502–512, because not all latch pair outputs in FIG. 5A are used external to shift register 408, and therefore, may not explicitly appear in FIG. 5A. At T=0, the L1 latches are inactive, and the L1 latch of latch pair 502 holds a logic "low", corresponding to the steady state condition of shift register 408 before the start of clock generator 400. At transition $t_4$ of VCO signal 318, the L1 latches become active, and gated clock pulse 406 at the input of latch pair 502 appears on the L1 output of latch pair 502, as indicated by transition $t_5$ of L1 output latch pair 502, constituting a leading edge of pulse 612. Concomitantly, at edge $t_4$, the L2 latches become inactive, and the L2 latch of latch pair 502 holds the logic "low" at the L1 output of latch pair 502 prior to edge $t_4$. One-half cycle of VCO signal 318 later, at edge $t_6$, the L2 latches again become active, and the logic "high" at the L1 output of latch pair 502 propagates through to the L2 output of latch pair 502. Another half-cycle later, the L1 output of latch pair 504 rises as the L1 latches become active, with the input of latch pair 504 coupled to the L2 output of latch pair 502, in the cascaded chain of latch pairs constituting shift register 408. In succeeding cycles of VCO signal 318, the gated clock pulse launched at T=0 propagates down the remaining latch pairs 506–512 in the cascade chain, as pulses 620–634 as shown in FIG. 6. Note that pulses 616, 620, 624, 628, and 632 are generated on L1 outputs and are shifted by one-half of a VCO 318 cycle from the preceding pulse.

The generation of memory clock output 428 may be further understood by referring to the timing diagrams illustrated in FIGS. 6–10. Clock output 428 for each of five clock ratios which may be provided in the embodiment of FIG. 5A are also illustrated in FIGS. 6–10. The clock output pulses 428, for each of the respective clock ratios, are generated by logical combinations of L1 and L2 outputs from predetermined ones of latch pairs 502–512. For each clock ratio, a latch pair output selected for generating clock output 428 are enabled by asserting one of mode signals 562–568 and the corresponding one or more of decodes 570–576. As previously discussed in conjunction with FIG. 5A, clock output 428 is generated by logically NORing, in NOR gates 553 and 595, outputs from AND gates 535–539 and 541–547, respectively. The output of NOR gate 553 is delayed by one cycle at VCO 318 in latch pair 591. Similarly, the output of NOR gate 595 is delayed one cycle of VCO 318 in latch pair 593. AND-NOR logic 536 receives taps off of shift register 408 from L2 outputs of selected latch pairs 502–512. AND-NOR logic 531 receives taps off of shift register 408 from L1 outputs. Latch pair 591 is an L1/L2 pair and latch pair 593 is an L2/L1 pair. In this way, race conditions in the latches may be avoided. Outputs of latch pairs 591 and 593 are provided to respective inputs of NAND gate 580. An output of NAND gate 580 provides clock 428. Latch pairs 591 and 593 provide clock staging for operation with the bus interface apparatus that is the subject of the aforesaid commonly-owned, co-pending U.S. patent application, Ser. No. 09/377,632. In an alternative embodiment of the present invention, latch pairs 591 and 593 may be omitted, with the outputs of NOR gate 553 and 595 provided directly to respective inputs of NAND gate 580.

Referring first to FIG. 6, which, as previously discussed, shows a timing diagram for an embodiment of the present invention in which the memory clock period is twice the period of p-clock 102. To select the ratio of two, mode 560 is asserted. As previously described, output 544 is coupled to an input of OR gate 553 in AND-NOR logic 536. Thus, when output 544 is asserted, the output of OR gate 553 is asserted. This is delayed by one cycle of VCO signal 318 in latch pair 591, the output of which generates clock output 428. Thus, pulse 614 in FIG. 6, delayed by one cycle of VCO signal 318 outputs a first pulse on clock 428, pulse 636. Clock pulses for other ratios of memory clock period to p-clock period are similarly generated by selecting taps off of shift register 408.

Figure 7A:
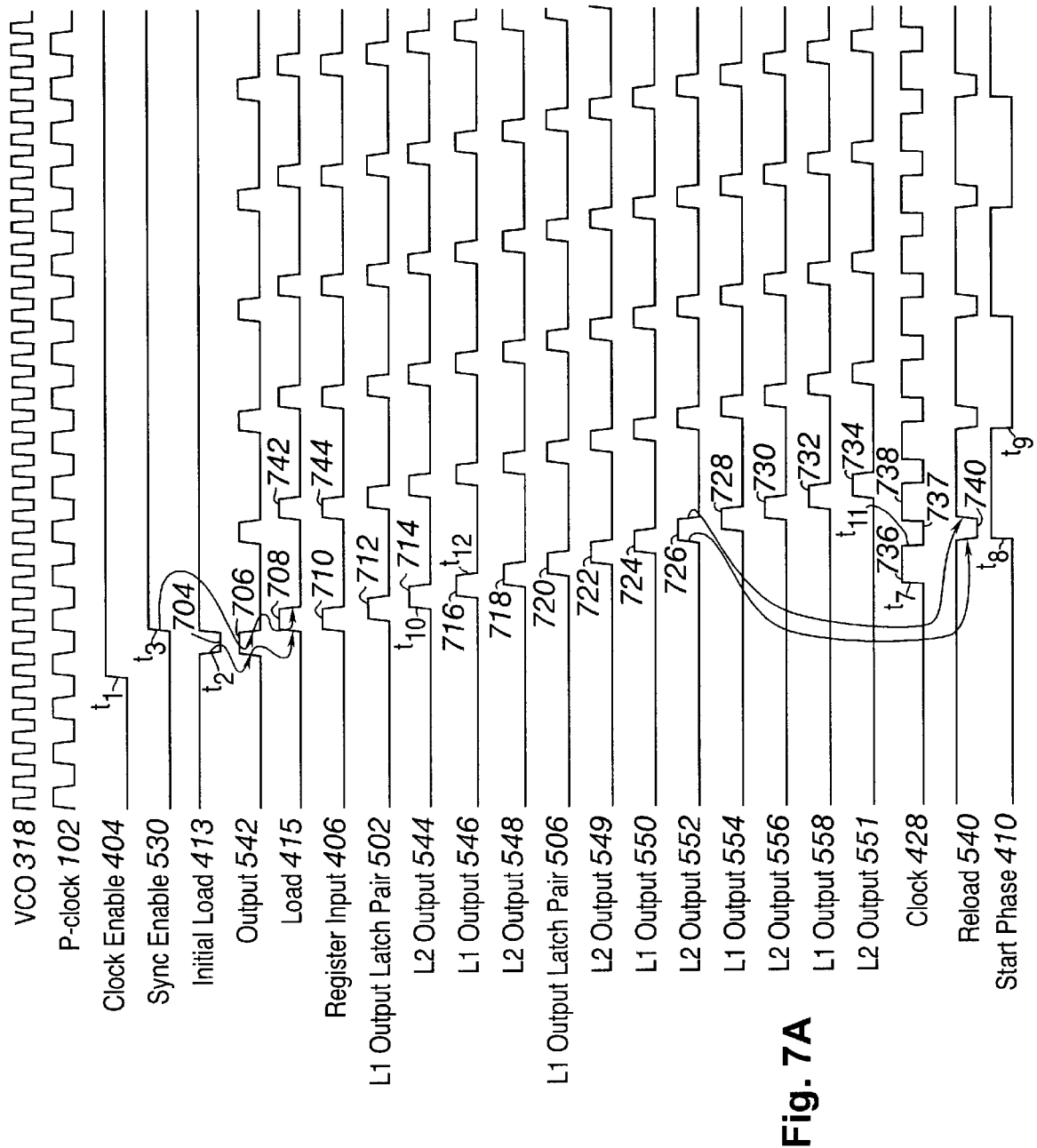
FIG. 7A schematically illustrates a timing diagram for a memory clock generator in accordance with another embodiment of the present invention.

Referring now to FIG. 7A, the timing diagram for an embodiment of the present invention in which the ratio of the memory clock period to p-clock period is two and one-half is shown. The starting of an embodiment of memory clock generator 400 having a period ratio in accordance with the timing diagram in FIG. 7A is the same as discussed in conjunction with FIG. 6. Pulse 704 corresponds to pulse 604 and pulse 706 corresponds to pulse 606, and generates pulse 708. In response to pulse 708 on load 415, a sequence of pulses propagates along shift register 408, pulses 712–734.

Clock output 428 is generated by enabling taps off of shift register 408 in response to mode control 562. Mode control 562 is asserted when a clock ratio of two and one-half is selected. Additionally, the timing diagram of FIG. 7A corresponds to an embodiment in which duty cycle control 426 is negated. Consequently, decodes 570 and 572 are asserted, enabling AND gates 541 and 535, respectively. Mode control 562 enables AND gate 545. Thus, pulse 736 on clock 428 is generated by pulse 714 and pulse 716 which is delayed by one-half cycle of VCO 318. Rising edge $t_7$ corresponds to edge $t_{10}$ of pulse 714 and falling edge $t_{11}$ of pulse 736 is formed by falling edge $t_{12}$ of pulse 716. (Recall that, in the clock generator embodiment of FIG. 5A, latches 591 and 593 introduce a delay of one cycle of VCO 318 between the assertion of the outputs of OR gates 553 and 595 and the assertion of the corresponding pulses on clock 428.) Similarly, pulses 724 on output 550 and pulse 726 on output 552 generate pulse 738 on clock 428. In the embodiment of FIG. 5A having a clock ratio of two and one-half corresponding to the timing diagram of FIG. 7A, the pulse 736 has a width that exceeds the width of negated portion 737 by one-half cycle of VCO 318.

Figure 7B:
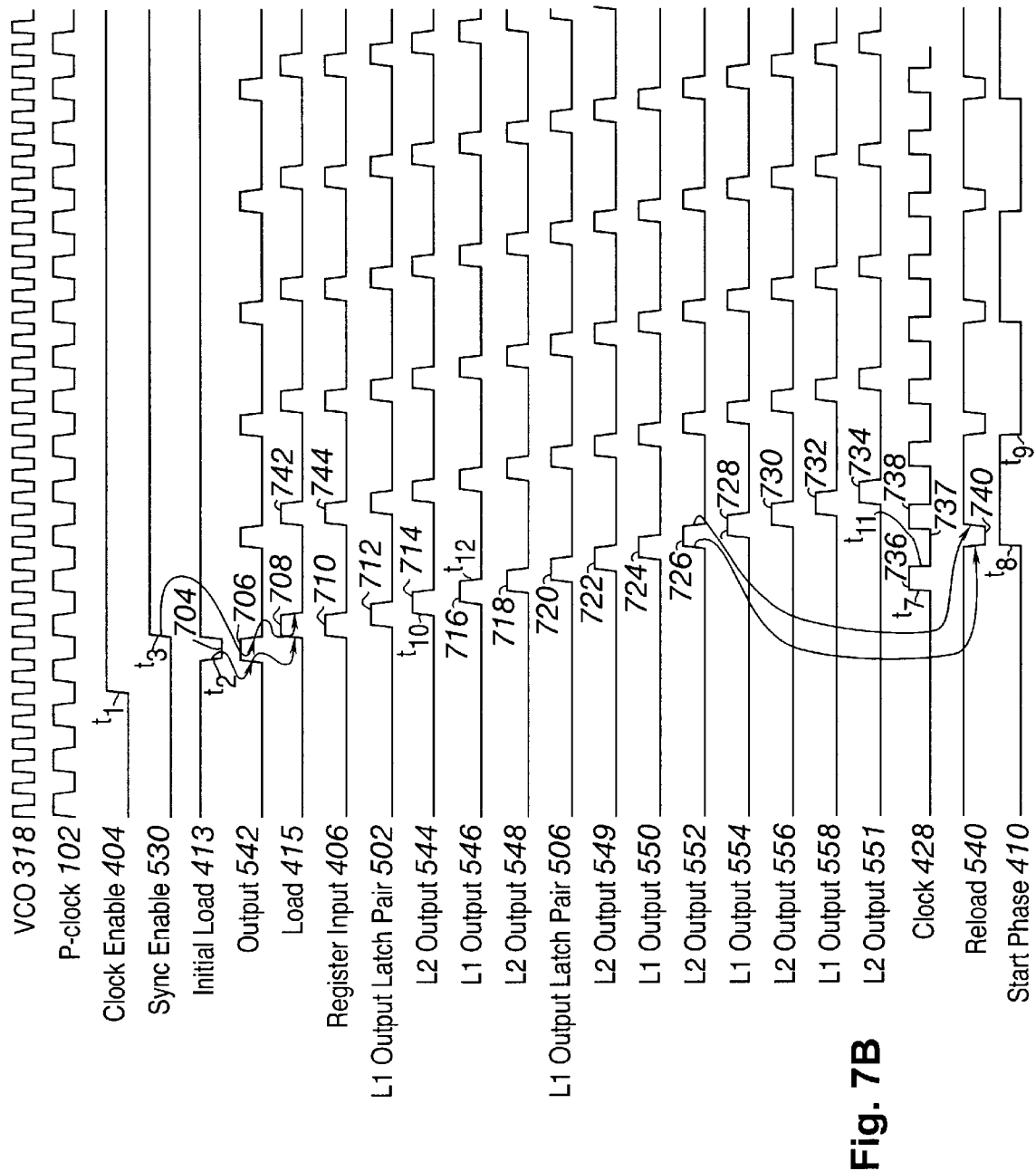
FIG. 7B schematically illustrates a timing diagram for a memory clock generator in accordance with the embodiment of FIG. 7A in which a clock duty cycle has an alternative selection.

Refer now to FIG. 7B illustrating a timing diagram of an embodiment having a clock ratio of two and one-half in which duty cycle control 426 is asserted. In response thereto, decodes 570 and 572 are negated, in contrast to the embodiment of FIG. 7A. Clock 428 is generated from outputs 544 and 550. Rising edge $t_{10}$ of pulse 714 on output 544 corresponds to edge $t_7$ of pulse 736 on clock 428. Falling edge $t_{11}$ of pulse 736 corresponds to edge $t_{12}$ of pulse 714. Pulse 736 is delayed by one cycle of VCO 318 relative to pulse 714 by latch pair 591. Similarly, pulse 738 on clock 428 is generated by pulse 724 on output 550. In the embodiment of clock generator 400, FIG. 5A corresponding to the timing diagram of FIG. 7B, the width of pulses 736 and 738 is shorter than that of negated portion 737 by one-half cycle of VCO 318.

Figure 8:
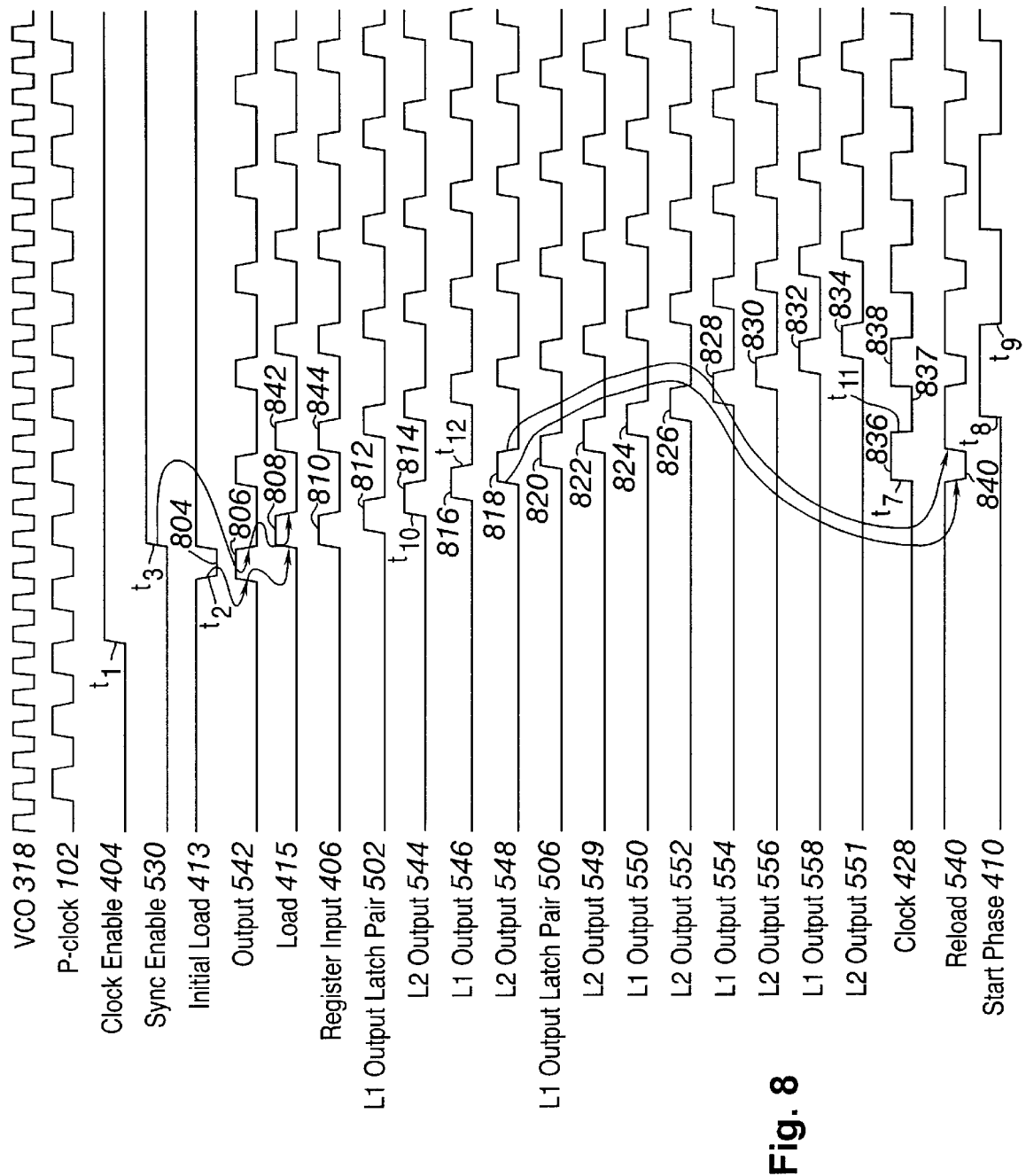
FIG. 8 schematically illustrates a timing diagram for a memory clock generator in accordance with yet another embodiment of the present invention.

The timing diagram for an embodiment of memory clock generator 400 having a period ratio of three, is shown in FIG. 8. Again, the startup of such a memory clock is the same as described in conjunction with FIG. 6. Pulses 804 and 806 correspond to pulses 604 and 606, respectively, FIG. 6, and generate pulse 808 on load 415. Thus, in response to the assertion of clock enable 404, pulse 810 on register input 406 is generated. Pulse 810 propagates along shift register 408, pulses 812–834. The first pulse, pulse 836, on clock 428 is generated in response to pulses 814 and 816 on outputs 544 and 546 of shift register 408. These are selected via AND gate 541 by the action of decode 570, and NOR gate 595. Rising edge $t_7$ of pulse 836 corresponds to edge $t_{10}$ of pulse 814, and falling edge $t_{11}$ of pulse 836 corresponds to edge $t_{12}$ of pulse 816. Edges $t_7$ and $t_{11}$ are delayed by one cycle of VCO 318 relative to the respective edges $t_{10}$ and $t_{12}$ by latch pairs 591 and 593, respectively. The second output pulse, pulse 838, on clock 428 is generated in response to a second pulse launched on shift register 408, described further below.

Figure 9A:
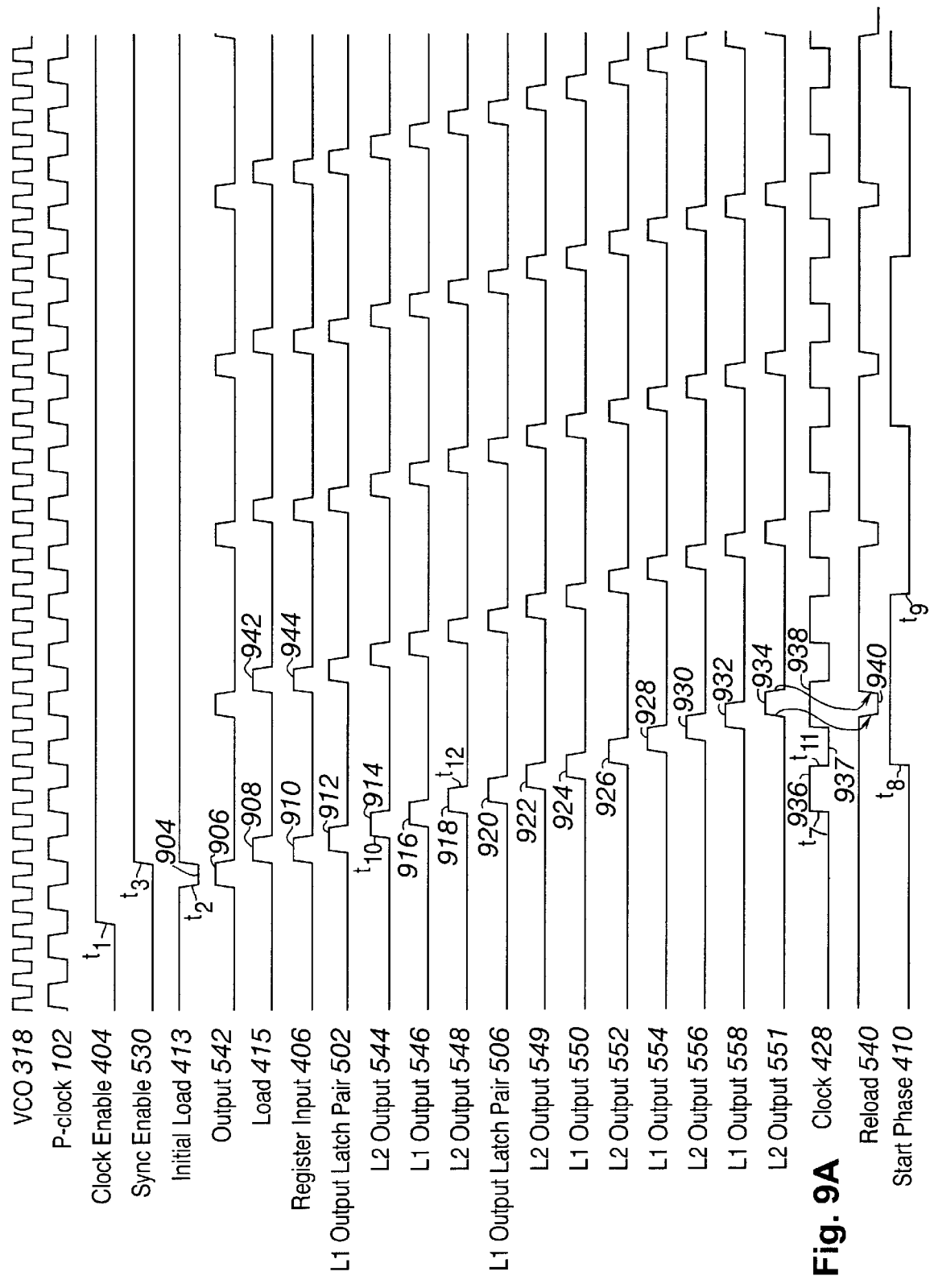
FIG. 9A schematically illustrates a timing diagram for a memory clock generator in accordance with yet another embodiment of the present invention.

FIG. 9A illustrates a timing diagram for an embodiment of memory clock 400 having a ratio of memory clock period to p-clock period of three and one-half. FIG. 9A corresponds to an embodiment of clock generator 400 in which duty cycle control 426 is negated. The start up is the same as described in conjunction with FIG. 6 with pulses 904 and 906 corresponding to pulses 604 and 606, respectively. Pulse 908 on load 415 is generated in response to pulses 904 and 906 in the same fashion as pulse 608, FIG. 6. In response to pulse 908, pulse 910 launches a pulse train on shift register 408, pulses 912–934.

A first pulse, pulse 936, on clock 428 is generated by tapping pulses 914, 916 and 918 off of pulse train 912–934 in shift register 408. A rising edge, $t_7$, of pulse 936 on clock 428 corresponds to edge $t_{10}$ of pulse 914, and a falling edge, $t_{11}$ of pulse 936 corresponds to edge $t_{12}$ of pulse 918. As discussed previously in conjunction with FIGS. 6–8, the corresponding edges are delayed by one cycle of VCO 318 through latch pairs 591 and 593. A second pulse 938 is generated in similar fashion from pulses 928, 930, and 932 on outputs 554, 556, and 558, respectively. A width of pulse 936 exceeds that of negated portion 937 by one-half cycle of VCO 318.

Figure 9B:
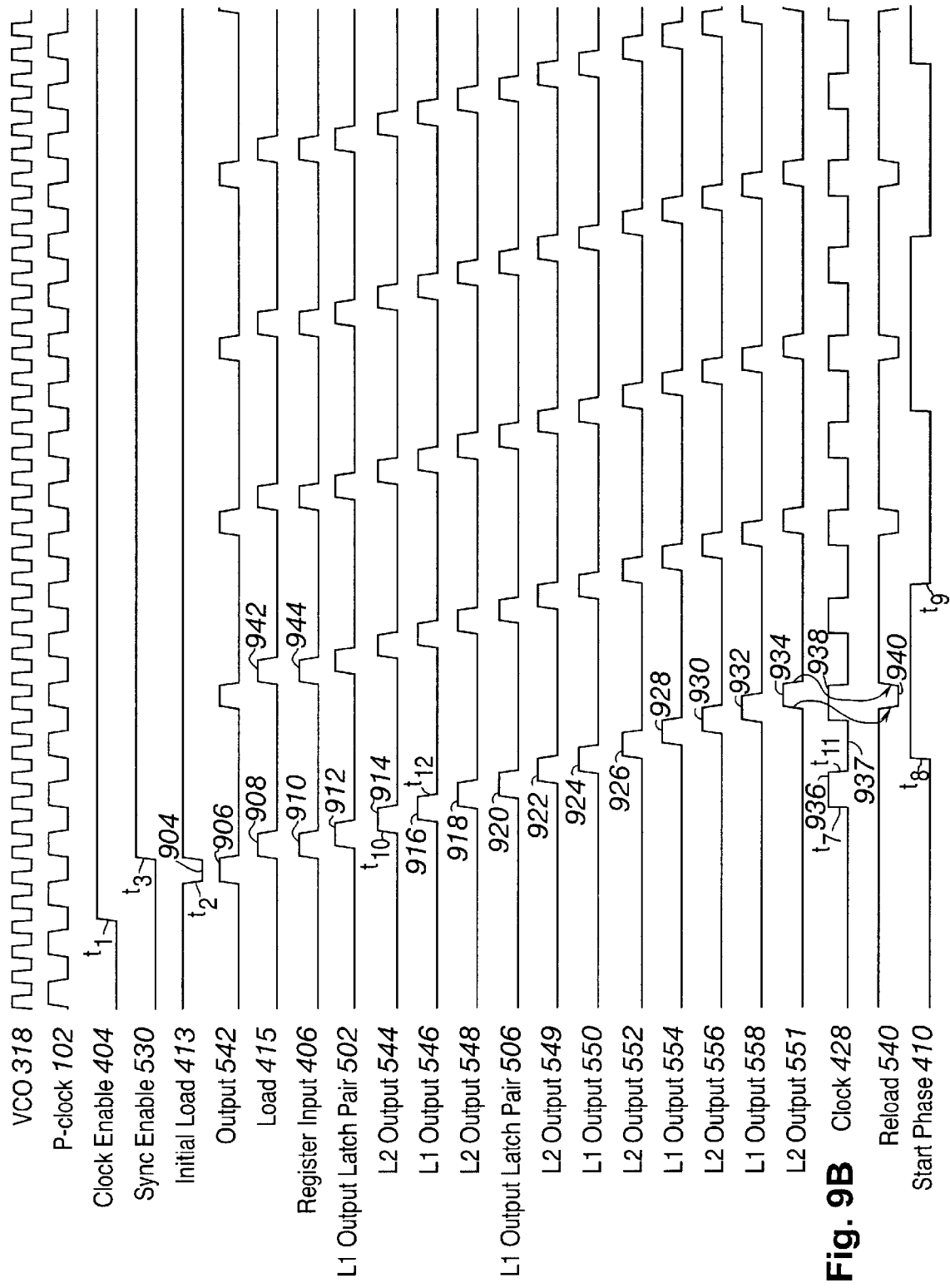
FIG. 9B schematically illustrates a timing diagram for a memory clock generator in accordance with the embodiment of FIG. 9A in which a clock duty cycle has an alternative selection.

Refer now to FIG. 9B illustrating a timing diagram corresponding to an embodiment having a clock ratio of three and one-half in which duty cycle control 426 is asserted. In response, decodes 574 and 576 are negated, in contrast to the embodiment corresponding to FIG. 9A.

Clock 428 is generated from outputs 544 and 546, and outputs 554 and 556. Pulse 936 is generated from pulses 914 and 916, wherein a rising edge, $t_7$, of pulse 936 corresponds to edge $t_{10}$ of pulse 914, and a falling edge, $t_{11}$ of pulse 936 corresponds to edge $t_{12}$ of pulse 916. A second pulse 938 is generated in similar fashion from pulses 928, and 930 on outputs 554 and 556, respectively. The width of pulse 936 is less than the width of negated portion 937 by one-half cycle of VCO 318.

Figure 10:
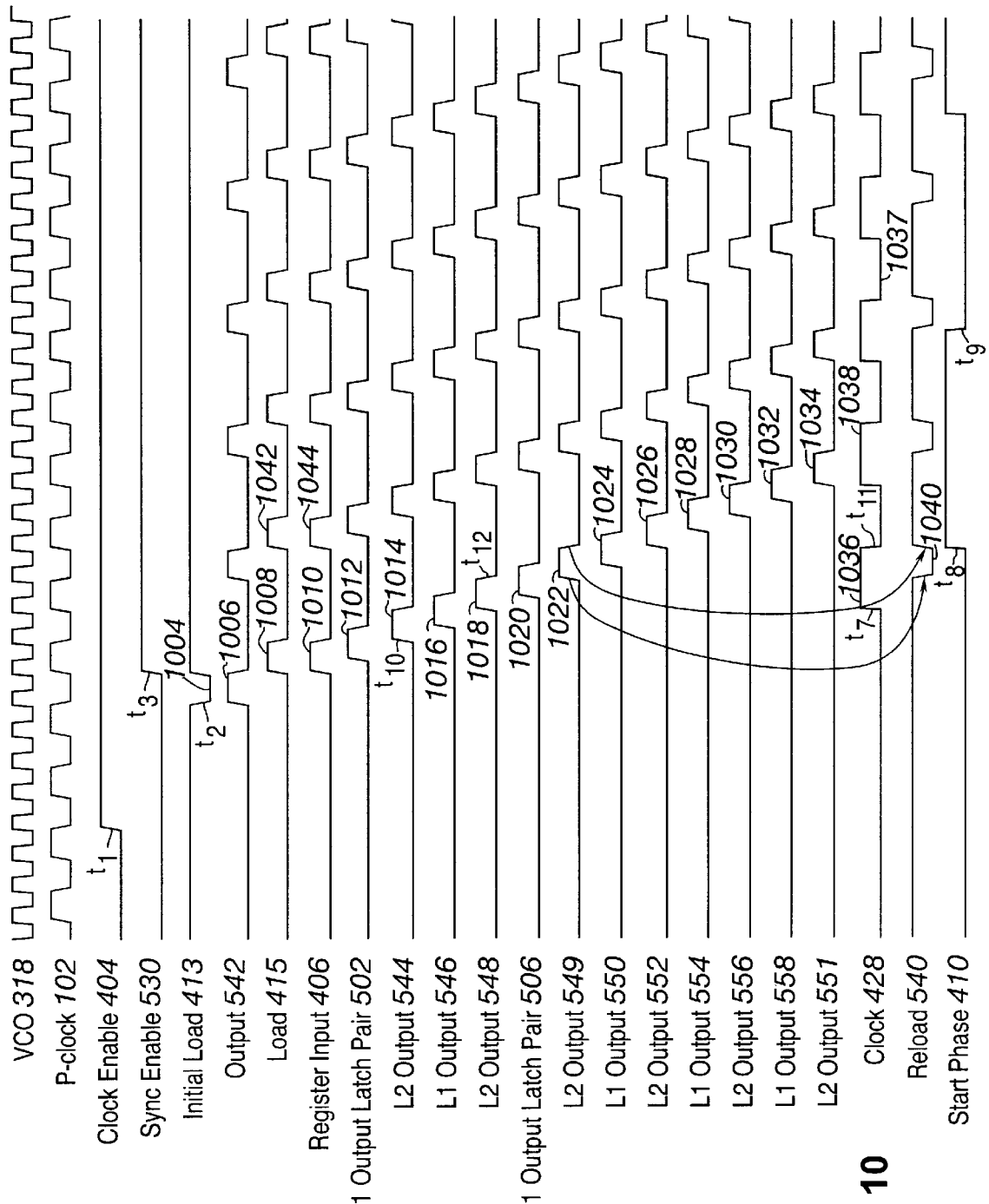
FIG. 10 schematically illustrates a timing diagram for a memory clock generator in accordance with still another embodiment of the present invention.

A memory clock signal having a period of four times the period of p-clock 102 may be generated in accordance with the timing diagram illustrated in FIG. 10. As in the embodiments previously described in conjunction with FIGS. 6–9, a pulse train including pulses 1012–1034 is clocked along shift register 408 in response to pulse 1010 on register input 406. A first pulse, pulse 1036 in clock 428, is generated in response to pulses 1014 and 1018 on outputs 544 and 548, respectively, of shift register 408. Output 548 is selected in response to mode 568 and decode 574 generated therefrom, provided to AND gate 537. A rising edge, $t_7$, of pulse 1036 corresponds to edge $t_{10}$ of pulse 1014, and a falling edge, $t_{11}$ of pulse 1036 corresponds to edge $t_{12}$ of pulse 1018. As discussed previously in conjunction with FIGS. 6–9, the corresponding edges are delayed by one cycle of VCO 318 through latch pairs 591 and 593. Pulse 1038 on clock 428 for this period ratio is generated by a second pulse launched on register input 406. Subsequent pulses are also launched on register input 406 to generate a clock pulse train in each of the embodiments corresponding to FIGS. 6–10.

To generate a train of clock pulses in clock output 428, a subsequent register input 406 must be asserted at the input of shift register 408, in FIG. 5A. Reload logic 412 in FIG. 5A contains AND-OR logic 538 including a plurality of AND gates 555, 557, 559, 561, and 563. Outputs from AND gates 555–563 are ORed in OR gate 565. An output of OR gate 565 is provided to the second input of NAND gate 533 as described hereinabove in conjunction with FIG. 5A. A first input to AND gate 555 is coupled to L2 output 544 of latch pair 502. A first input of AND gate 557 receives the L2 output 548 of latch pair 504, and a first input to AND gate 559 is coupled to L2 output 549 of latch pair 506. L2 output 552 is provided to a first input of AND gate 561. AND gate 563 receives L2 output 551 from latch pair 512. Second inputs to each of AND gates 555, 557, 559, 561 and 563 are coupled, respectively to mode signal 560, 564, 568, 562, and 566. Depending on the preselected clock ratio, when the corresponding one of L2 output 544, L2 output 548, L2 output 549, L2 output 552, and L2 output 551 is asserted, the output of OR gate 565, which may be active "low," is asserted, and coupled to the input of latch pair 529 via NAND gate 533. Output 542 of NAND gate 533 is thereby asserted, and after a one VCO 318 cycle delay, load 415 is asserted.

Thus, in FIG. 6, the reload sequence starts when reload 540, which may be active "low", is asserted, via pulse 640, in response to pulse 614 appearing at output 544 in shift register 408. Pulse 614 is gated through AND gate 555 in AND-OR logic 538 by the action of mode control 560. Reload 540 is inverted at output 542 of NAND gate 533. Following a delay of one cycle of VCO signal 318, load 415 is asserted, pulse 642, and, because sync enable 530 is active, pulse 644 appears on register input 406. In response, a second train of pulses is propagated along shift register 408.

Similarly, in FIGS. 7A and 7B, pulse 740 is generated on reload 540 in response to output 552 on shift register 408, through the action of AND gate 561 and mode select 562.

Following inversion at output 542 of NAND gate 533 and a delay of one cycle of VCO signal 318 in latch pair 529, load 415 is asserted, pulse 742, and generates pulse 744 on register input 406.

Likewise, in an embodiment in which the memory clock period to p-clock period ratio is three, in accordance with FIG. 8, a second pulse train is launched down shift register 408 in response to pulse 840 on reload 540, generated in response to output 548 in shift register 408. Pulse 840 is generated through the action of AND gate 557 and mode control 564. In this way, pulse 838, and thereafter, a train of clock pulses is generated.

In FIGS. 9A and 9B, illustrating the timing diagram for an embodiment in which the period ratio is three and one-half, a second pulse train is generated from pulse 944 on register input 406. Pulse 940 on reload 540, initiating the reload sequence, arises from output 551 in shift register 408 through the action of AND gate 563 and mode control 566.

For an embodiment in which the memory clock period is four times the period of p-clock 102, FIG. 10, the reload sequence is initiated by pulse 1040, on reload 540, which is derived from output 549 via AND gate 559, and mode control signal 568.

For each of the embodiments illustrated in FIGS. 6–10, succeeding cycles of clock 428 are generated by corresponding pulse trains propagating down shift register 408 in exactly the same fashion as previously described hereinabove in conjunction with each of the respective FIGS. 6–10.

Returning to FIG. 5A, memory clock generator 400 also outputs a start phase signal 410 to inform other portions of the CPU that the memory clock has started. Start phase 410 may be provided to a bus interface in accordance with the commonly owned co-pending U.S. Patent Application Ser. No. 09/377,632 entitled "Bus Interface Apparatus and Method Therefor", incorporated by reference herein. Start phase signal 410 is generated via AND gate 569 AND-OR logic 573 and latch pairs 575 and 577. Latch pairs 575 and 577 are also clocked by register clock 416, not shown in FIG. 5A for simplicity.

AND-OR logic 573 includes a pair of AND gates, 581 and 583. Outputs of these gates are provided to OR gate 585. A first, inverting input in AND gate 581 is coupled to output 548 of shift register 408. A first input of AND gate 583 is also coupled to output 548. A second input of gate 581 is coupled to the output of AND gate 569, and a second, inverting, input of AND gate 583 is coupled to an output of latch pair 575, an input of which is coupled to an output of OR gate 585. Thus, AND-OR logic 573 forms a multiplexer (MUX) selecting between the output of AND gate 569 and the output of latch pair 575 in response to the signal at output 548 of shift register 408 which thus provides the MUX select.

Recall, that, in steady state, before clock enable 404 is asserted, sync enable 530 is negated, as seen, for example, in FIG. 6. Output 548 is also negated, and consequently, start phase 410, is, in steady state, also negated. At edge $t_3$ sync enable 530 is asserted. However, AND gate 569 is held closed by the feedback from the output of latch pair 575. Two VCO 318 cycles after transition $t_3$, the initial pulse, such as pulse 610 in FIG. 6, clocks through to output 548, AND-OR logic 573 selects for outputting the complement of the output of latch pair 575. After an additional delay of two cycles of VCO signal 318 in latch pairs 575 and 577, start phase 410 is asserted, transition $t_8$.

After an additional lapse of one cycle of VCO 318, output 548 is negated as the pulse launched down shift register 408 passes out of latch pair 504. MUX 573 then selects for outputting the output of gate 569, which is now opened by the feedback from the output of latch pair 575. When the next pulse propagates down shift register 408 and appears on output 548, MUX 573 again selects for outputting the complement of the output of latch pair 575. Following a two cycle delay through latch pairs 575 and 577, this generates edge $t_9$ on start phase 410. In this way, each subsequent pulse train through shift register 408 generates an edge on start phase 410, and start phase 410 constitutes a periodic signal as seen in FIGS. 6–10. Moreover, the edge $t_8$ has a predetermined temporal relationship with the initial transition of clock 428, $t_7$. In an embodiment of the present invention the temporal relationship may be two cycles of VCO signal 318 after edge $t_7$, as illustrated in FIGS. 6–10. As previously described, memory clock generator 400 is started by asserting clock enable 404. Additionally, in the embodiment corresponding to the timing diagrams in FIGS. 6–10, the initial rising edge, $t_7$, of clock output 428 occurs at the same time as the rising edge of p-clock 102 and VCO signal 318. Subsequent alignments of the rising edge of clock output 418 and p-clock 102 and VCO signal 318 are marked by a rising edge of start phase 410, which occurs two VCO 318 cycles after the alignment occurs. In alternative embodiments, the phase of the rising edge of clock output 428 and p-clock 102 may be marked by another, predetermined, edge of start phase 410, and such embodiments would be within the spirit and scope of the present invention.

A memory clock generation mechanism has been provided that derives a memory clock from the processor clock in open loop fashion. In this way, the memory clock is not locked to the processor clock, affording better flexibility in design from a timing perspective. Additionally, the memory clock generation mechanism of the present invention reduces reliance on process and temperature dependent elements that may otherwise be incorporated in a conventional phase locked loop system.

Although the present invention and its advantages have been described in detail, it should be understood that various changes, substitutions and alterations can be made herein without departing from the spirit and scope of the invention as defined by the appended claims.

What is claimed is:

1. A memory clock generator comprising:
 a shift register operable for inputting a first input signal in response to a first clock signal, said shift register having a predetermined first set of output taps;
 first logic circuitry operable for receiving signals from said first set of output taps and a plurality of control signals operable for selecting a ratio of a period of said memory clock to a period of said first clock, wherein said first logic circuitry outputs a second clock signal, said memory clock being output in response to said second clock signal;
 wherein said shift register includes a predetermined second set of output taps, said second set of output taps outputting signals operable for launching a second input signal into said shift register.

2. The clock generator of claim 1 wherein said memory clock is output by a divide-by-two circuit clocked from said second clock signal.

3. The clock generator of claim 1 further comprising second logic circuitry operable for receiving said signals from said second set of output taps, said second logic circuitry outputting a signal operable for launching said input signal into said shift register.

4. The clock generator of claim 1 further comprising third logic circuitry operable for receiving a plurality of mode signals, said third logic circuitry generating a first subset of said plurality of control signals in response to said mode signals, and said mode signals comprising a second subset of said plurality of control signals.

5. The clock generator of claim 1 wherein said shift register comprises a plurality of latch pairs, a first one of said plurality being operable for receiving said first input signal, wherein a next one of said plurality of latch pairs has an input operable for receiving a first output of a previous one of said plurality of said latch pairs, a first latch of each latch pair including said input and a second latch of said latch pair having said first output, and wherein an output of said first latch is coupled to an input of said second latch.

6. The clock generator of claim 1 further comprising circuitry operable for inputting said first input signal into said shift register in response to an enable signal.

7. The clock generator of claim 1 further comprising circuitry operable for outputting a signal for indicating said memory clock is running.

8. The clock generator of claim 7 wherein said circuitry operable for outputting said signal for indicating said memory clock is running comprises:
   an AND gate having a first input for receiving an enable signal;
   a multiplexer (MUX) having a first input operable for receiving an output of said AND gate; and
   first and second latch cascaded pairs, said first latch pair having an input operable for receiving an output of said MUX, an output of said second latch pair providing said signal for indicating said memory clock is running, and wherein said MUX includes a second input operable for receiving an output from said first latch pair.

9. The clock generator of claim 1 wherein said shift register is clocked in response to a third clock signal.

10. A memory clock generator comprising:
    a shift register operable for inputting a first input signal in response to a first clock signal, said shift register having a predetermined first set of output taps;
    first logic circuitry operable for receiving signals from said first set of output taps and a plurality of control signals operable for selecting a ratio of a period of said memory clock to a period of said first clock, wherein said first logic circuitry outputs a second clock signal, said memory clock being output in response to said second clock signal;
    wherein said first logic circuitry comprises:
       a plurality of AND gates, each AND gate having first and second inputs and an output, each first input operable for receiving a signal from one of said first set of output taps, and each second input being operable for receiving a corresponding one of said plurality of control signals; and
       an OR gate having a plurality of inputs, each AND gate output being coupled to one of said plurality of OR gate inputs, and one of said plurality of OR gate inputs being coupled to a corresponding one of said first set of output taps, said OR gate outputting said second clock signal.

11. A method of generating a memory clock comprising the steps of:
    shifting a first input pulse through a shift register;
    tapping a first predetermined set of outputs off of said shift register;
    logically combining said first set of outputs with a first plurality of first control signals, wherein said first plurality of first control signals are operable for selecting a ratio of a period of said memory clock to a period of said first clock signal; and
    outputting a result of said step of logically combining said first set of outputs, said memory clock being generated in response to said result;
    wherein said shift register comprises a plurality of latch pairs.

12. The method of claim 11 further comprising the step of dividing said result by a predetermined divisor to generate said memory clock.

13. The method of claim 11 wherein said plurality of latch pairs are clocked in response to a second clock signal.

14. The method of claim 11 further comprising the step of launching said first input pulse on an input of said shift register in response to a second control signal operable for starting said memory clock.

15. The method of claim 11 further comprising the step of shifting a second input pulse through said shift register in response to a reload signal.

16. The method of claim 15 further comprising the step of launching said second pulse on an input of said shift register in response to said reload signal.

17. The method of claim 15 further comprising the steps of:
    tapping a second predetermined set of outputs off of said shift register; and
    logically combining said second set of outputs with a second plurality of first control signals, wherein said second plurality of first control signals are operable for selecting a ratio of a period of said memory clock to a period of said first clock signal, wherein a result of said combining step comprises said reload signal.

18. The method of claim 11 further comprising the step of outputting a clock start signal in response to a second control signal operable for starting said memory clock and an output of a predetermined stage of said shift register.

19. A data processing system comprising:
    a central processing unit (CPLJ), said CPU including a memory clock generator; and
    a memory operable for storing data and instructions for said CPU, wherein said memory communicates said data and instructions in response to a memory clock from said memory clock generator, said memory clock generator comprising:
       a shift register operable for inputting a first input signal in response to a first clock signal, said shift register having a predetermined first set of output taps; and
       first logic circuitry operable for receiving signals from said first set of output taps and a plurality of control signals operable for selecting a ratio of a period of said memory clock to a period of said first clock, wherein said first logic circuitry outputs a second clock signal, said memory clock being output in response to said second clock signal;
    wherein said shift register includes a predetermined second set of outputs, said memory clock generator further comprising second logic circuitry operable for receiving said second set of outputs, said second logic circuitry outputting a gating signal operable for launching a second input signal into said shift register.

20. The data processing system of claim 19 wherein said shift register comprises a plurality of latch pairs, a first one of said plurality being operable for receiving said first input signal, wherein a next one of said plurality of latch pairs has an input operable for receiving a first output of a previous one of said plurality of said latch pairs, a first latch of each latch pair including said input and a second latch of said latch pair having said first output, and wherein an output of said first latch is coupled to an input of said second latch.

21. The data processing system of claim 19 further comprising circuitry operable for inputting said first input signal into said shift register in response to an enable signal from said CPU.

22. The data processing system of claim 19 further comprising circuitry operable for outputting a signal to said CPU for indicating said memory clock generator is running.

23. The data processing system of claim 22 wherein said circuitry operable for outputting a signal to said CPU for indicating said memory clock is running comprises:

an AND gate having a first input for receiving an enable signal;

a multiplexer (MUX) having a first input operable for receiving an output of said AND gate; and first and second cascaded latch pairs, said first latch pair having an input operable for receiving an output of said MUX, an output of said second latch pair providing said signal for indicating said memory clock is running, and wherein said MUX includes a second input operable for receiving an output from said first latch pair.

24. The data processing system of claim 22 wherein said CPU further comprises memory interface circuitry operable for communicating said data and instructions for said CPU, said memory interface circuitry communicating said data and instructions in response to said memory clock, and wherein said memory interface circuitry initiates in response to said signal for indicating said memory clock is running.

* * * * *

UNITED STATES PATENT AND TRADEMARK OFFICE
CERTIFICATE OF CORRECTION

PATENT NO.   : 6,550,013 B1
DATED        : April 15, 2003
INVENTOR(S)  : Gilles Gervais, James D. Wagoner and Stephen D. Weitzel It is certified that error appears in the above-identified patent and that said Letters Patent is hereby corrected as shown below:

<u>Column 16,</u>
Line 39, replace "(CPLJ)" with -- (CPU) --.

Signed and Sealed this

Twenty-eighth Day of October, 2003

JAMES E. ROGAN
*Director of the United States Patent and Trademark Office*